United States Patent
Bailey et al.

(10) Patent No.: US 9,923,718 B2
(45) Date of Patent: Mar. 20, 2018

(54) AUTHENTICATION METHODS AND APPARATUS USING BASE POINTS ON AN ELLIPTIC CURVE AND OTHER TECHNIQUES

(71) Applicant: EMC Corporation, Hopkinton, MA (US)

(72) Inventors: Daniel Vernon Bailey, Pepperell, MA (US); John G. Brainard, Sudbury, MA (US); Ari Juels, Brookline, MA (US); Burton S. Kaliski, Jr., Wellesley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 956 days.

(21) Appl. No.: 13/961,319

(22) Filed: Aug. 7, 2013

(65) Prior Publication Data
US 2013/0322622 A1  Dec. 5, 2013

Related U.S. Application Data

(63) Continuation of application No. 11/671,264, filed on Feb. 5, 2007, now Pat. No. 9,137,012.

(60) Provisional application No. 60/764,826, filed on Feb. 3, 2006.

(51) Int. Cl.
 H04L 9/08 (2006.01)
 H04L 29/06 (2006.01)
 H04W 12/06 (2009.01)
 H04L 9/32 (2006.01)

(52) U.S. Cl.
 CPC ......... *H04L 9/0861* (2013.01); *H04L 9/3228* (2013.01); *H04L 9/3234* (2013.01); *H04L 63/0492* (2013.01); *H04L 63/08* (2013.01); *H04W 12/06* (2013.01); *H04L 63/0838* (2013.01); *H04L 2209/805* (2013.01)

(58) Field of Classification Search
 CPC ...................................................... H04L 9/0861
 See application file for complete search history.

(56) References Cited

U.S. PATENT DOCUMENTS

| 5,347,580 | A | | 9/1994 | Molva et al. |
| 5,442,707 | A | * | 8/1995 | Miyaji ............. G06F 7/725 380/30 |
| 5,600,722 | A | | 2/1997 | Yamaguchi et al. |

(Continued)

OTHER PUBLICATIONS

Aydos, M., T. Yanik, and C. K. Koc. "High-speed implementation of an ECC-based wireless authentication protocol on an ARM microprocessor." IEE Proceedings-Communications 148.5 (2001): 273-279.*

*Primary Examiner* — Samson Lemma
*Assistant Examiner* — Carlos Amorin
(74) *Attorney, Agent, or Firm* — Ryan, Mason & Lewis, LLP

(57) ABSTRACT

In one aspect, a method comprises the steps of deriving a base point on an elliptic curve in a first processing device, generating authentication information in the first processing device utilizing the base point and a private key of the first processing device, and transmitting the authentication information from the first processing device to a second processing device. The base point on the elliptic curve may be derived, for example, by applying a one-way function to a current time value, or by computation based on a message to be signed.

20 Claims, 2 Drawing Sheets

(56) References Cited

U.S. PATENT DOCUMENTS

| | | | |
|---|---|---|---|
| 5,657,388 A | 8/1997 | Weiss | |
| 6,085,320 A | 7/2000 | Kaliski, Jr. | |
| 6,996,722 B1 | 2/2006 | Fairman et al. | |
| 7,039,021 B1 | 5/2006 | Kokudo | |
| 7,080,259 B1 | 7/2006 | Nakanishi et al. | |
| 7,181,015 B2 | 2/2007 | Matt | |
| 7,260,393 B2 | 8/2007 | Fnu et al. | |
| 7,266,695 B2 | 9/2007 | Nakayama | |
| 7,324,462 B1 | 1/2008 | Page et al. | |
| 7,350,076 B1 | 3/2008 | Young et al. | |
| 7,379,546 B2* | 5/2008 | Ibrahim | G06F 7/725 380/259 |
| 7,464,865 B2 | 12/2008 | Brown et al. | |
| 7,519,178 B1* | 4/2009 | Matyas, Jr. | G06F 7/72 380/255 |
| 7,571,489 B2 | 8/2009 | Ong et al. | |
| 7,597,250 B2 | 10/2009 | Finn | |
| 7,672,459 B2 | 3/2010 | O'Hara, Jr. et al. | |
| 7,774,611 B2 | 8/2010 | Muntz et al. | |
| 7,813,512 B2* | 10/2010 | Futa | H04L 9/0844 380/285 |
| 7,822,209 B2 | 10/2010 | Fu et al. | |
| 7,827,409 B2 | 11/2010 | Fascenda | |
| 7,934,005 B2 | 4/2011 | Fascenda | |
| 2002/0025034 A1* | 2/2002 | Solinas | H04L 9/3066 380/30 |
| 2002/0181701 A1 | 12/2002 | Lee | |
| 2003/0014637 A1 | 1/2003 | Ellison et al. | |
| 2003/0081785 A1* | 5/2003 | Boneh | H04L 9/0847 380/277 |
| 2003/0123656 A1* | 7/2003 | Izu | G06F 7/725 380/30 |
| 2004/0222878 A1 | 11/2004 | Juels | |
| 2004/0230809 A1* | 11/2004 | Lowensohn | G06F 21/35 713/186 |
| 2005/0018851 A1* | 1/2005 | Venkatesan | H04L 9/3257 380/277 |
| 2005/0036609 A1* | 2/2005 | Eisentraeger | G06F 7/725 380/30 |
| 2005/0055567 A1 | 3/2005 | Libin et al. | |
| 2005/0136964 A1 | 6/2005 | Le Saint et al. | |
| 2006/0050870 A1* | 3/2006 | Kimmel | H04L 63/0428 380/30 |
| 2006/0068760 A1 | 3/2006 | Hameed et al. | |
| 2006/0137015 A1 | 6/2006 | Fahrny et al. | |
| 2006/0285682 A1* | 12/2006 | Sarangarajan | H04L 9/003 380/28 |
| 2007/0061566 A1* | 3/2007 | Bailey | H04L 9/0866 713/151 |
| 2007/0081508 A1 | 4/2007 | Madhavan et al. | |
| 2007/0118891 A1 | 5/2007 | Buer | |
| 2007/0140163 A1 | 6/2007 | Meier et al. | |
| 2007/0186105 A1* | 8/2007 | Bailey | H04L 63/0492 713/168 |
| 2007/0250712 A1 | 10/2007 | Salgado et al. | |
| 2007/0283151 A1* | 12/2007 | Nakano | H04L 63/0442 713/168 |
| 2008/0065892 A1* | 3/2008 | Bailey | H04L 63/0492 713/171 |
| 2008/0109661 A1* | 5/2008 | Sotoodeh | G06F 21/79 713/191 |
| 2008/0165955 A1* | 7/2008 | Ibrahim | G06F 7/725 380/30 |
| 2009/0080645 A1* | 3/2009 | Furukawa | G06Q 20/382 380/28 |
| 2011/0194694 A1* | 8/2011 | Struik | H04L 9/3252 380/255 |

* cited by examiner

AUTHENTICATION METHODS AND APPARATUS USING BASE POINTS ON AN ELLIPTIC CURVE AND OTHER TECHNIQUES

RELATED APPLICATION(S)

The present application is a continuation of U.S. patent application Ser. No. 11/671,264, filed Feb. 5, 2007, and entitled "Wireless Authentication Methods and Apparatus," which claims the priority of U.S. Provisional Patent Application Ser. No. 60/764,826, filed Feb. 3, 2006 and entitled "The RFID Authenticator," both of which are incorporated by reference herein. Other related applications include U.S. patent application Ser. No. 11/939,232 filed Nov. 13, 2007, and entitled "Authentication Methods and Apparatus Using Pairing Protocols and Other Techniques, and U.S. patent application Ser. No. 11/768,608, entitled "Authentication Methods and Apparatus Utilizing Hash Chains," which are also continuations of above-noted U.S. patent application Ser. No. 11/671,264, and are incorporated by reference herein.

FIELD OF THE INVENTION

The present invention relates generally to techniques for authentication, and more particularly to authentication tokens or other processing devices utilized in authentication operations.

BACKGROUND OF THE INVENTION

The growing need for better user authentication is drawing increased attention to technologies such as one-time passwords. In a one-time password system, a user typically carries a device or "token" that generates and displays a series of passwords over time. The user reads the currently displayed password and enters it into a personal computer, e.g., via a Web browser, as part of an authentication operation. Such a system offers a significant improvement over conventional password-based authentication since the password is dynamic and random. Previously misappropriated one-time passwords are of no help to an attacker in determining the current password, which remains hard to guess.

One particular example of a one-time password device of the type described above is the RSA SecurID® user authentication token, commercially available from RSA, The Security Division of EMC Corporation, of Bedford, Mass., U.S.A. For a number of years, SecurID® has been the dominant solution in two factor authentication. Its relative simplicity combined with its independence from client-side software has contributed in no small measure to its success in many large enterprises. In a typical embodiment, a SecurID® authentication token may comprise a small handheld device with an LCD screen that displays a new one-time tokencode consisting of six to eight decimal digits every 60 seconds. An ordinary user would utilize this tokencode, possibly in combination with a personal identification number (PIN) with the resulting combination called a passcode, instead of a static password to access secure resources. Each displayed tokencode is based on a secret seed and the current time of day. Any verifier with access to the seed and a time of day clock can verify that the presented tokencode is valid.

A wireless authentication token, that is, a token that transmits authentication information over the air rather than via the user, can offer many attractions. Such a token can alleviate much of the burden on users in manually entering tokencodes or other authentication information. It can also achieve considerably higher transmission bandwidth, opening up a range of new functions beyond simple authentication, such as encryption. Wireless tokens can offer several other potential advantages as well, such as hands-free authentication for physically demanding environments like hospitals and factory floors, and rapid fire authentication for temporally demanding situations, such as online auctions.

Conventional aspects of wireless authentication tokens are described in, for example, M. Corner, "Transient Authentication for Mobile Devices," PhD Thesis, University of Michigan, 2003. The approach disclosed therein is designed to protect information on mobile devices such as laptops from exposure in the event of theft or loss. Its authentication protocol utilizes bidirectional communication between mobile devices and authentication tokens. Such an approach is problematic, however, in that authentication tokens that accept input in their authentication protocols can be vulnerable to active attacks.

Accordingly, a need exists for improvements in wireless authentication tokens and other processing devices utilized in authentication operations.

SUMMARY OF THE INVENTION

Illustrative embodiments of the present invention meet the above-identified need by providing improved techniques for authentication utilizing authentication tokens or other processing devices.

In accordance with one aspect of the invention, a base point on an elliptic curve is derived in a first processing device. Authentication information is generated in the first processing device utilizing the base point and a private key of the first processing device, and the authentication information is transmitted from the first processing device to a second processing device. The base point on the elliptic curve may be derived, for example, by applying a one-way function to a current time value, or by computation based on a message to be signed. The authentication information transmitted from the first processing device to the second processing device may also be transmitted to an authentication server.

In accordance with a further aspect of the invention, one or more key-encapsulating ciphertexts are generated and stored in a processing device. The processing device receives authentication information from another processing device, and utilizes the authentication information to decrypt at least one of the key-encapsulating ciphertexts to recover an associated key. The authentication information may comprise, for example, a tokencode.

In an illustrative embodiment, the authentication information may comprise a plurality of gradually rotating keys with overlapping refresh intervals. As a more particular example, the authentication information may comprise a plurality of hash chains wherein successive ones of the hash chains overlap one another in a designated number of time steps. Elements of a given one of the hash chains may be computed one time step at a time, starting at a tail of the chain, and when a particular one of the elements is output, an associated memory location may be released so as to be made available for storage of other hash chain elements. The processing devices may jointly associate a unique identity with a given one of a plurality of time steps over which the authentication information is released such that public keys can be computed for respective ones of the time steps and utilized for identity-based encryption without knowledge of corresponding secret keys.

In accordance with yet another aspect of the invention, authentication information is received from a first processing device in a second processing device, and a digital signature is generated in the second processing device by signing data that incorporates at least a portion of the received authentication information. The received authentication information is generated at least in part from a secret seed stored in the first processing device. The received authentication information may be combined with the digital signature generated by the second processing device to form a joint signature that is transmitted to an authentication server.

In an illustrative embodiment, the received authentication information comprises a tokencode and the digital signature is generated by signing data that incorporates the tokencode. The data that is signed to generate the digital signature may comprise an electronic document having the tokencode appended thereto.

In accordance with a further aspect of the invention, authentication information is generated in a first processing device, and data to be signed is received from a second processing device. A digital signature is generated in the first processing device by signing the received data utilizing at least a portion of the authentication information. The digital signature is generated only after the first processing device receives out-of-band verification of the data to be signed. For example, the received data may comprise an electronic document or a hash of an electronic document, and the out-of-band verification may provide the first processing device with evidence that the data to be signed has one or more characteristics perceptible to a user that requested generation of the digital signature.

The techniques of the illustrative embodiments overcome one or more of the problems associated with the conventional techniques described previously. For example, certain of the techniques can be implemented at least in part in an authentication token with limited computation and communication resources.

These and other features and advantages of the present invention will become more readily apparent from the accompanying drawings and the following detailed description.

DETAILED DESCRIPTION

The present invention will be described herein with reference to an example one-time password system in which a wireless authentication token emulates standard wireless communication messages of an access point to transmit authentication information. It is to be appreciated, however, that the invention is not restricted to use in this or any other particular system configuration.

Additional details regarding certain conventional cryptographic techniques referred to herein may be found in, e.g., A. J. Menezes et al., Handbook of Applied Cryptography, CRC Press, 1997, which is incorporated by reference herein.

The term "password" as used herein is intended to be construed broadly, so as to encompass any type of authentication information that may be required in order to obtain access to an access-controlled application or other resource. Thus, the term is intended to encompass, for example, tokencodes, passcodes or other numeric or alphanumeric codes, sets of words, sentences, phrases, answers to questions, responses to challenges, or any other type of authentication information.

Also, although the illustrative embodiments are described in the context of one-time passwords, that is, passwords that are typically used only for a single access, other embodiments can use passwords that are not limited to single use, that is, passwords that each can be used for two or more accesses.

The present invention in an illustrative embodiment provides an improved one-time password device comprising an output-only wireless authentication token that does not accept external input in its authentication protocol. Alternative embodiments are not limited to such output-only wireless authentication tokens.

Figure 1:
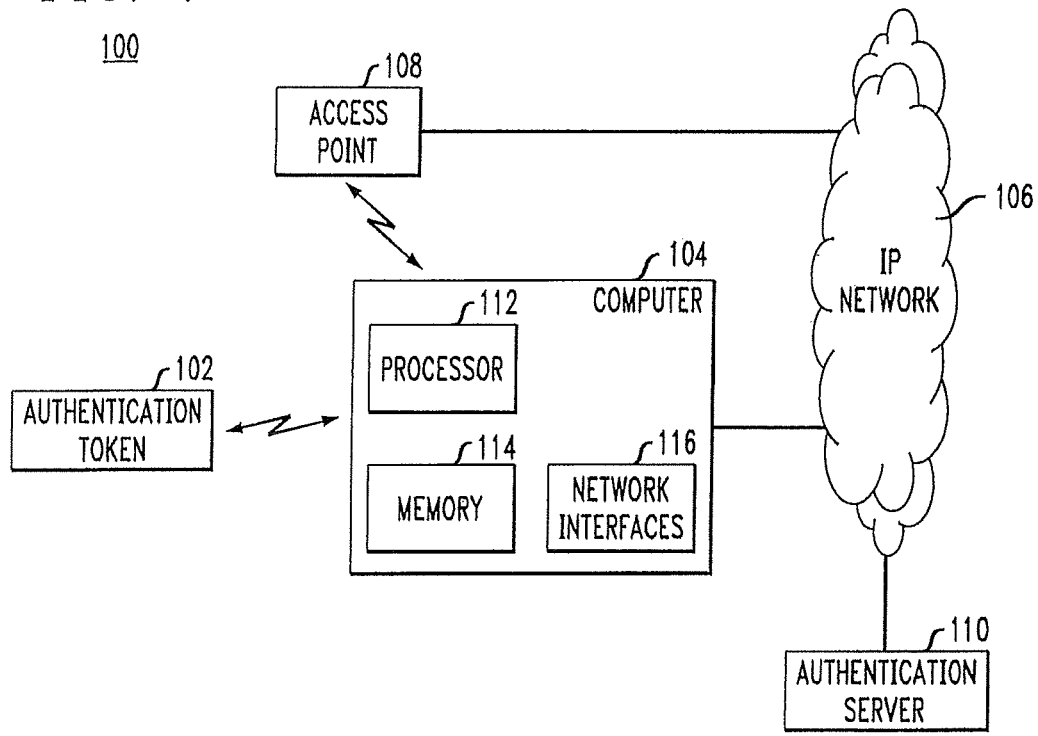
FIG. 1 is a block diagram of an exemplary one-time password system in an illustrative embodiment of the invention.

FIG. 1 shows a one-time password system 100 in one embodiment of the invention. The system 100 includes a wireless authentication token 102, a computer 104 and a network 106. The wireless authentication token 102 is able to communicate with the computer 104 via a wireless connection, as will be described in greater detail below. The computer 104 communicates with network 106 in a conventional manner, which may utilize a wired or wireless connection.

The wireless authentication token 102 may be in the form of an otherwise conventional handheld authentication token, such as a key fob, or may be in the form of an RFID tag or other type of stand-alone authentication token. Alternatively, it may be incorporated in or implemented in the form of another type of processing device, such as a mobile telephone, personal digital assistant (PDA), wireless email device, multimedia player, handheld or portable computer, game system, etc.

Techniques for incorporating one-time password functionality into a multimedia player are disclosed in U.S. patent application Ser. No. 11/556,506, filed Nov. 3, 2006 and entitled "Password Presentation for Multimedia Devices," which is commonly assigned herewith and incorporated by reference herein. The present invention may make use of audio, video or other multimedia passwords, as described therein.

The computer 104 may be a desktop or portable personal computer, a microcomputer, a workstation, a mainframe computer, a wired telephone, a television set top box, a game system, a kiosk, or any other processing device which can serve as an intermediary between a given wireless authentication token 102 and the network 106. Certain processing devices may comprise dual functionality, that is, may include both wireless authentication token capabilities for authenticating themselves to other devices, while also including capabilities for authenticating other wireless authentication tokens.

Thus, it is to be appreciated that elements such as 102 and 104 in the system 100 need not take any particular physical form. A wide variety of different system configurations are possible. For instance, a wireless authentication token could be used to authorize a mobile telephone to place a call over a wireless network. Similarly, the wireless authentication token could comprise software running on a PDA or mobile telephone authenticating the user to a vending machine in a wireless payments scenario.

It is assumed in this embodiment that the network 106 is an Internet protocol (IP) network, and such a network may comprise, for example, a global computer network such as the Internet, a wide area or metropolitan area network, or various portions or combinations of these and other types of networks. Moreover, the computer 104 communicates with an access point 108 using a standard wireless local area network (WLAN) communication protocol, which in the present embodiment is assumed to be in accordance with the IEEE 802.11 standard, also commonly known as "Wi-Fi." The 802.11 standard is described in, for example, IEEE Standard 802.11, Wireless LAN Medium Access Control (MAC) and Physical Layer (PHY) Specifications, 1999 Edition, which is incorporated by reference herein. The term "802.11 standard" as used herein is intended to be construed generally, so as to encompass individual portions of 802.11, such as 802.11a, 802.11b, 802.11g, etc. and their respective standard documents are hereby incorporated herein by reference.

The access point 108 may also be coupled to the IP network 106, as shown, although it may be alternatively be connected to a separate IP network or other type of network. The access point 108 is assumed to part of a WLAN that includes one or more access points and one or more stations. The computer 104 may be viewed as representing one particular station of the WLAN in the present illustrative embodiment.

The network 106 is assumed to have associated therewith a validation service or other type of authentication authority that is capable of authenticating passwords submitted via the computer 104. Such an authority may be configured in a well-known conventional manner. It may comprise, for example, one or more servers accessible over the network 106, such as an authentication server 110.

The computer 104 as shown includes a processor 112, a memory 114 and a number of network interfaces 116. One such network interface is utilized for communicating in a conventional manner with the IP network 106, while another is used for communicating in a conventional manner with access point 108 over the WLAN. In the illustrative embodiment, the network interface that the computer utilizes to communicate with access point 108 over the WLAN is also utilized to receive authentication information from the wireless authentication token 102, as will be described in greater detail below in conjunction with the flow diagram of FIG. 3.

Although the wireless authentication token 102 and computer 104 are shown as separate devices in FIG. 1, other embodiments of the invention may combine the functionality of these elements into a single processing device. For example, a given wireless authentication token may be configured to connect to the network 106 via a wireless connection established with the access point 108, without the use of a separate intermediary device such as computer 104. In such an arrangement, the access point 108 may be configured to extract authentication information from frames transmitted by the wireless authentication token.

It is to be appreciated that a given embodiment of the system 100 may include multiple instances of wireless authentication token 102, computer 104, network 106, access point 108 and authentication server 110, as well as additional or alternative elements, although only single instances of elements 102, 104, 106, 108 and 110 are shown in the system diagram for clarity of illustration.

Figure 2:
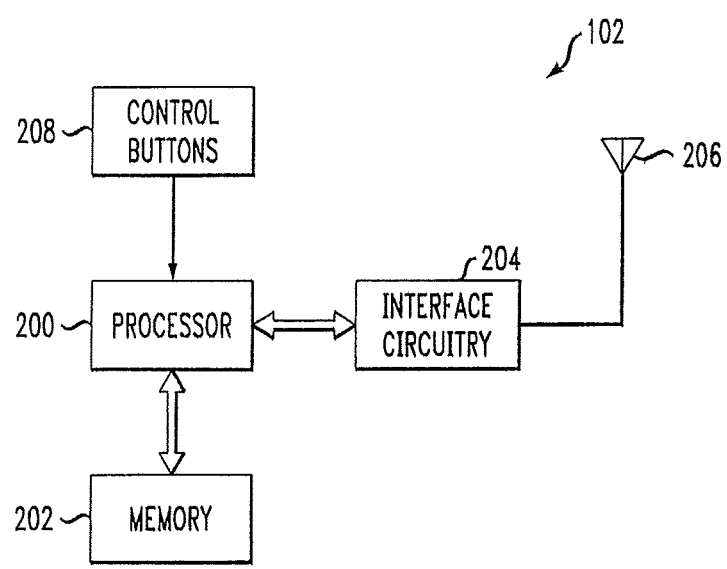
FIG. 2 shows one possible implementation of a wireless authentication token of the FIG. 1 system.

FIG. 2 shows a more detailed view of the wireless authentication token 102 of FIG. 1. As indicated above, such a device is an example of what is more generally referred to herein as a processing device. The wireless authentication token 102 in this implementation includes a processor 200 coupled to a memory 202 and to interface circuitry 204. These device elements may be implemented in whole or in part as a conventional microprocessor, digital signal processor, application-specific integrated circuit (ASIC) or other type of circuitry, as well as portions or combinations of such circuitry elements. The interface circuitry 204 is coupled to an antenna 206. The interface circuitry 204 communicates via antenna 206 with a corresponding network interface 116 of the computer 104.

The wireless authentication token 102 as shown includes one or more control buttons 208. A given such button may be used, for example, to cause the wireless authentication token to transmit authentication information to the computer 104. In other embodiments, such buttons may be eliminated entirely, with the wireless authentication token autonomously controlling its communication functions without user intervention, for example, based on automatic detection of proximity of the token to the computer, sensor activation, periodic or continuous transmission, etc. For example, continuous transmission may be advantageous to users in physical environments that favor hands-free authentication, e.g., fast-paced medical environments and factory floors. It should be noted, however, that the lack of user initiation increases the risk of relay and replay attacks.

Hybrid arrangements may also be used. For example, a dual-use token may be configured to generate output in response to a button press by the user as well as to generate output based on proximity detection or other automatic technique. As another example, a dual-use token may generate output in response to button activation, but may be "locked" to transmit continuously if desired. Such hybrid tokens are advantageous in that they allow the user to choose a tradeoff between security and convenience.

As will be appreciated by those skilled in the art, portions of a wireless authentication technique in accordance with an embodiment of the invention can be implemented at least in part in the form of one or more software programs that are stored in memory 202 and executed by the corresponding processor 200. Thus, the memory 202, in addition to storing seeds or other information used to generate one-time passwords or other authentication information, may be used to store program instructions and other information used to perform operations associated with generation, transmission and other processing of such authentication information. Memory 202 may comprise, for example, multiple physically-separate storage elements of various types, including random access memory (RAM), read-only memory (ROM), Flash or other non-volatile memory, disk-based memory, etc. in any combination.

The wireless authentication token 102 is advantageously configured to transmit authentication information to the computer 104 by emulating an actual access point of the WLAN. More specifically, in this embodiment the processor 200 of the wireless authentication token is operative to control the transmission of information via the network interface circuitry 204 in a manner that emulates standard communications of the access point 108 of the WLAN, although the wireless authentication token itself is not configured to operate as an actual access point of the WLAN. A given station of the WLAN that receives the transmitted information, such as computer 104, is able to determine that the transmitted information originates from an emulated access point rather than an actual access point. The computer 104 responds to this condition by utilizing the transmitted information in conjunction with a protocol that is not part of the standard communications. For example, the computer in the present embodiment may extract a one-time password or other authentication information from the transmitted information and initiate an authentication process using the extracted authentication information.

The communications of the wireless authentication token in the present embodiment emulate communications compliant with the 802.11 standard. For example, as will be described in greater detail below, the transmitted information may comprise an 802.11 beacon frame or probe response frame, with the one-time password or other authentication information being carried at least in part in a Service Set Identifier (SSID) field of the beacon frame or probe response frame. As indicated previously, such information may be transmitted, for example, responsive to a user command entered via one of the control buttons 208, or may be transmitted periodically or continuously without user intervention. The authentication information may be encrypted by the wireless authentication token prior to transmission using a key established through interaction with the computer.

This approach exploits the methods by which 802.11 stations determine which wireless networks in range offer service. 802.11 wireless access points and ad-hoc network participants advertise their existence by sending out beacon frames, which are unsolicited management frames sent to a broadcast address, and probe response frames, which are sent in response to probe frames sent out by stations seeking access points or other stations with which to potentially associate. Beacon frames and probe response frames contain many data fields. The present embodiment utilizes the SSID field, which in conventional practice is typically used to indicate the natural language name of a network (e.g., "RSA Labs Wireless"), to carry authentication information. The SSID field can be given an arbitrary value and will still be received and propagated unchanged up the protocol stack by commodity 802.11hardware and drivers on Windows platforms and other platforms.

The SSID field is not the only 802.11 field that could be used for transmission. For example, the 6-byte network MAC address, the up to 8-byte supported rates field, the 8-byte timestamp, the 2-byte beacon interval, the 2-byte capabilities field, or a combination of these could also or alternatively be used. The smaller size of these fields and their greater import in the 802.11 link layer indicates that the SSID is likely better suited for use in the illustrative embodiment. Another example, described in the attached Appendix, involves using the traffic indication map field of the beacon frame. See the Appendix for additional details regarding these and other fields of beacon frames. As another example, vendor specific fields of up to 255 bytes can also be appended to probe response frames and used to carry authentication information.

It is therefore to be appreciated that, in other embodiments, authentication information may be carried in other types of 802.11 fields or frames. However, as indicated above, the SSID field is one of the few 802.11 fields that is necessarily made available to higher layers in the same form in which it was received. Thus, it is particularly well suited for carrying authentication information from a management frame up the protocol stack to a user-mode application.

The wireless authentication 102 in this embodiment thus sends messages by advertising itself as an ad-hoc network participant, sending out one or more beacon frames or probe response frames upon activation. The SSID field identifies the frame as part of the authentication protocol and carries whatever cryptographic payload is necessary to authenticate the token to the computer. Software on the computer continuously searches for access points; when one is found whose SSID identifies it as having come from a token, it delivers the cryptographic payload in that field to higher-layer security applications. The SSID field is at most 32 bytes long. This is a very small payload by networking standards, but it is large enough to carry small payloads such as a one-time password or symmetric cryptographic key. In fact, this technique of sending a payload using unconventional 802.11 fields could be applied to other areas such as sensor networks where power consumption is far more important than large data payloads. To further increase throughput, the token can masquerade as two or more access points to increase the number of payloads sent. For its part, the computer could reconstruct the fragmented message from the various payloads. The throughput of this communication channel could be further enhanced using an error-correcting code. In practice, we can expect that some data payloads will be lost. Depending on the relative size of the message and the fragments, an error-correcting code could provide the ability to recover from the loss of a fragment.

With this approach, only a small, exceptionally simple subset of 802.11 need be implemented in the wireless authentication token to send beacon frames and probe response frames.

Figure 3:
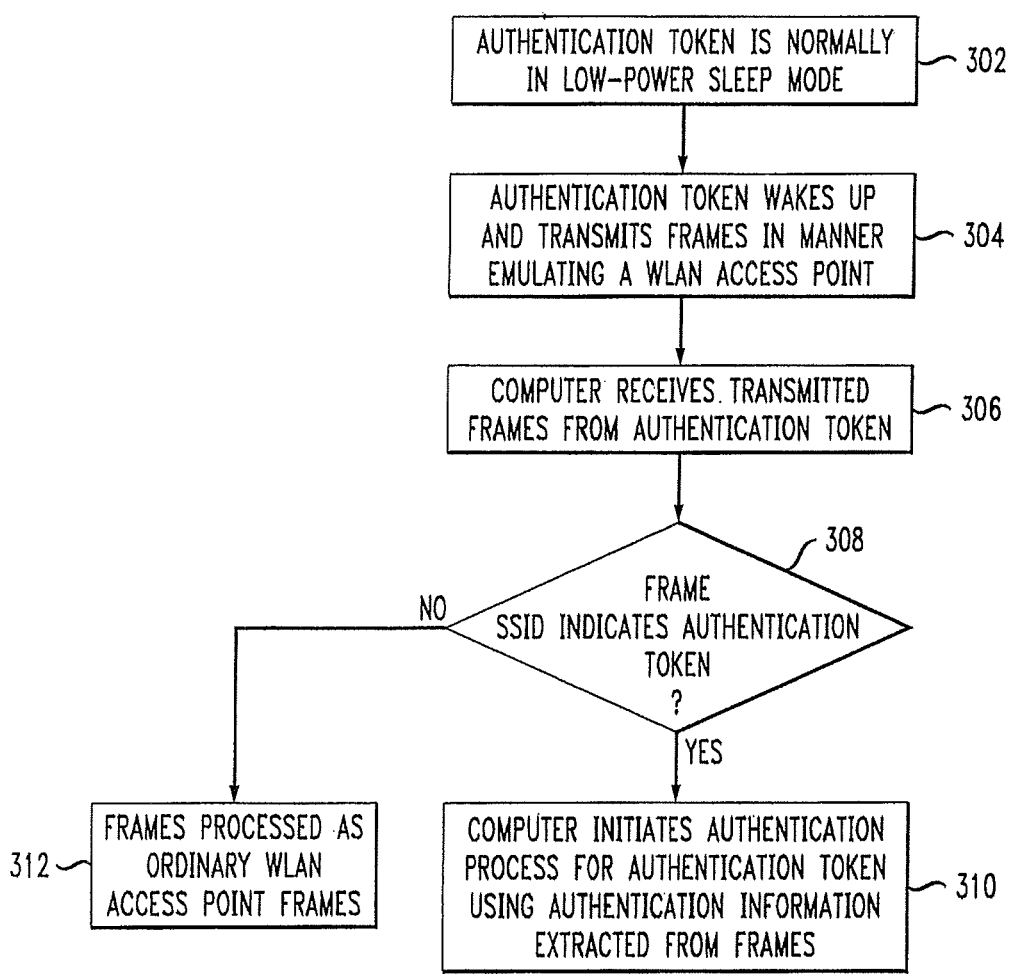
FIG. 3 is a flow diagram illustrating exemplary communications between a wireless authentication token and a computer in conjunction with an authentication protocol in an illustrative embodiment of the invention.

Referring now to the flow diagram of FIG. 3, the process of communicating authentication information from the wireless authentication token 102 to the computer 104 in the present illustrative embodiment is shown in greater detail.

In step 302, the wireless authentication token 102 is in a low-power sleep mode, which may be its normal configuration in order to conserve power.

In step 304, the token wakes up and transmits one or more frames of information in a manner which emulates standard communications of a WLAN access point, such as access point 108 in the system 100. These actions may be taken, for example, responsive to a user command, responsive to detected proximity to the computer 104, in accordance with an established rate of periodic transmission, or based on one or more other criteria or combinations thereof.

In step 306, the computer receives the one or more transmitted frames from the authentication token. The frames may be, for example, beacon frames or probe response frames, or combinations of both, as described above. As the token transmits the frames in a manner which emulates an access point of the WLAN, the frames are initially received and processed by the particular network interface 116 of the computer that would ordinarily communicate with WLAN access points.

In step 308, the computer processes the frame SSID to determine if the SSID is associated with a wireless authentication token. For example, the computer may store information specifying one or more features that distinguish a token SSID from an SSID of an actual access point. Any of a number of techniques may be used for this purpose, including providing the token SSID with a particular predetermined prefix or suffix, an error-correcting code or other distinguishing pattern. The computer could, for example, store a list of such distinguishing patterns for respective tokens.

If the frame SSID indicates an association with a wireless authentication token rather than an actual access point, the computer extracts a one-time password or other authentication information from the one or more frames, and initiates an authentication process using the extracted authentication information, as indicated in step 310.

If the frame SSID does not indicate an association with a wireless authentication token, the computer processes the one or more frames as it would any ordinary WLAN access point frames, such as frames received via the WLAN from the access point 108.

The respective processor and memory elements 112 and 114 may be configured to implement the computer portion of the authentication information communication protocol shown in the flow diagram of FIG. 3. For example, the memory 114 may be used to store the above-noted list of distinguishing patterns that are used to identify SSIDs that correspond to respective wireless authentication tokens, and the processor 112 can be configured under software control to control the operations associated with steps 308, 310 and 312 of the communication protocol.

Additional details regarding the illustrative embodiment described above in conjunction with the flow diagram of FIG. 3, as well as other alternatives and variants, can be found in the attached Appendix.

It is to be appreciated that, although the information transmitted by the wireless authentication token 102 in the present embodiment comprises authentication information, such as a one-time password, the communication protocol shown in FIG. 3 is more generally applicable to a wide variety of other communication contexts. In an example of a more general communication context, the wireless authentication token may be any processing device that emulates standard communications of an access point of a wireless network, and the transmitted information may be any type of information that is to be conveyed from the processing device to a station of the wireless network, or more generally, to another processing device via the wireless network. As another example, the approach disclosed herein may be adapted for use in communicating additional information via 802.11 frames using a processing device that already has a conventional 802.11 connection. Such an arrangement can serve as a mechanism for in effect establishing a second channel of 802.11 communications capable of carrying arbitrary information.

The wireless authentication token in the above-described embodiment may be viewed as a type of output-only authentication token, in that it participates in an authentication protocol without accepting input as part of that protocol. More particularly, it simply generates and transmits a one-time password or other authentication information without any external input influencing the generation of the authentication information. Such an arrangement advantageously provides enhanced security against active attacks, relative to conventional wireless authentication tokens that accept input in the course of their authentication protocols. It should be noted, however, that bidirectional communication may be used at a higher protocol layer, such as a network layer or a layer associated with initialization or key establishment, without compromising security.

Another advantage of the above-described embodiment is that it supports existing hardware and protocols. For example, it leverages the existing 802.11 WLAN interface circuitry that is present in the computer 104. The wireless authentication token 102 interfaces with standard computers enabled for 802.11 communications. The token requires no special-purpose hardware or drivers and fits with existing modes of 802.11 operation. Moreover, it can function in a manner that is completely transparent to authentication servers.

Yet another advantage of this approach is that it requires only lightweight computation and communication resources in the wireless authentication token. This facilitates its implementation in the form of handheld tokens, RFID tags or other configurations subject to power constraints or other limited resources.

The illustrative embodiment thus permits the use of standard, off-the-shelf 802.11 hardware and software drivers for computer 104 while avoiding unnecessary protocol complexity in a low-powered implementation of wireless token 102.

Although described in the context of 802.11, the techniques of the invention may be implemented using other types of wireless communication standards, including, for example, Bluetooth, wireless USB, Zigbee, 802.15.3, 802.15.4, etc. As a more particular example, it is noted that 802.15.4 defines alternative MAC and physical layers with various data transmission methods to reduce duty cycles in different scenarios. See J. Zheng and M. J. Lee, "Will IEEE 802.15.4 make ubiquitous networking a reality?," IEEE Communications Magazine, June 2004. However, unlike 802.11, 802.15.4 is not ubiquitous in currently available computers and other processing devices, and thus may present additional implementation challenges if utilized to implement a wireless authentication token of the type disclosed herein.

Other aspects of the present invention provide protocols by which a wireless authentication token such as token 102 can support encryption. Such encryption, although not a requirement of the invention, may be implemented using an initial key-establishment protocol or other type of pairing protocol between the token and computer, as will be described.

Although it was assumed above that the token 102 is output-only at the authentication protocol layer, different such tokens may have different network layer characteristics. By way of example, these can be classified based on characteristics such as neighbor discovery and transmission type.

With regard to neighbor discovery, a given token may be considered blind or reactive. A blind tag emits authentication information without awareness of which receivers are currently reachable, while a reactive token may utilize dynamic knowledge of local network topology to tailor its outputs to particular receivers.

With regard to transmission type, a given token may be considered promiscuous or targeted. A promiscuous tag emits authentication information to all discoverable devices in its vicinity, while a targeted tag transmits only to devices on a stored "whitelist" of permissible devices. Hybrids are possible of course, such as promiscuous tokens which transmit to all devices other than those on a stored "blacklist."

Tokens with these and other characteristics may be implemented using the techniques disclosed herein, as will be appreciated by those skilled in the art.

Pairing Protocols for Initialization and Key Establishment

A number of exemplary pairing protocols will now be described. Such protocols are used, for example, to initialize secure communications between wireless token 102 and computer 104 and to facilitate the establishment of shared keys.

In the following description, the computer 104 will be referred to as a mobile device or simply a "mobile" for purposes of illustration. This nomenclature should not be construed as requiring that the computer be a mobile device. To the contrary, as indicated previously herein the computer may be a relatively immobile device such as a desktop computer. A given key-establishment protocol or other type of pairing protocol as described below therefore may involve four entities, denoted token, user, mobile and server. With reference to the system 100 of FIG. 1 as previously described, the mobile may be viewed as an example of computer 104, and the server may be viewed as an example of authentication server 110.

A fundamental goal in a given pairing protocol is to establish a shared, secret, encryption key $K_{t,m}$ between a token t and a mobile device m. The encryption key $K_{t,m}$ secures tokencodes or other transmitted authentication information against passive eavesdroppers. It also may provide message integrity against active attackers. In addition, such a key can provide access control in that by allowing the mobile to decrypt tokencodes, the token effectively authorizes the mobile to receive them.

Given multiple pairings between the same token and multiple mobiles $m_1, \ldots, m_k$, the keys $K_{t,m_1}, \ldots, K_{t,m_k}$ may, of course, be related in various ways. These keys might derive from a master secret $K_t$ in the token, a variant that may be of particular interest for promiscuous tokens. In a very simple architecture, all keys ($K_{t,m_j}$) might be set to $K_t$ itself. In some cases, such as those in which key insulation is of interest, we may wish to consider a time parameter i for keys, and write $K^{(i)}_{t,m}$.

The same protocol used for establishment of an encryption key $K_{t,m}$ may also serve for establishment of a key for standalone token-to-mobile authentication.

The pairing protocol should establish any network-configuration data needed for the token to form valid network frames to carry its authentication information. For example, in an illustrative embodiment, the mobile and token may learn each other's MAC addresses.

In some cases, particularly in an enterprise setting, it may be desirable for an authenticating server to learn what pairings have been established. A given pairing protocol may involve a trusted server in the pairing process, such that the server learns pairing events by default.

It may also be desirable for the pairing protocol to support key confirmation. This may involve, for example, user verification of correct pairing in order to protect against an active attack or a user or machine error. One possible implementation may perform key confirmation by comparing confirmation codes produced by the token and a paired mobile device.

The pairing protocol may also be configured to support revocation of the ability of a given mobile to receive or process token authentication information. For example, upon pairing with a new mobile, a targeted token might receive from the server an updated whitelist of mobiles.

Mobiles that explicitly broadcast their network identification data are often referred to as "discoverable." In the illustrative embodiment, software on the mobile may be used to perform active probing. For example, the mobile may send out a particular type of MAC-layer management command called a probe request frame, typically used to discover new access points. In so doing, it broadcasts its MAC address, allowing the token to learn the MAC address without disrupting existing wireless connections. In fact, as mobiles listen for responses immediately after emitting probes, a token that transmits a tokencode to a mobile as it learns the device's MAC address will have a high probability of successful tokencode receipt. Such a token is an example of a reactive token.

Privacy concerns associated with surreptitious tracking of mobiles may be addressed by allowing for rotating pseudonyms, for example, using techniques such as those described in U.S. patent application Ser. No. 10/782,309 filed Feb. 19, 2004 and entitled "Low-Complexity Cryptographic Techniques for use with Radio Frequency Identification Devices," which is commonly assigned herewith and incorporated by reference herein.

This type of approach can be especially useful if the token has a time of day clock, in that once provisioned with keying material, a token could derive the mobile's current MAC address as a function of the key and the current time of day. As plans to enlarge the MAC address space are implemented, the odds of randomly selecting one that causes a naming collision in the local subnet is extremely small.

Similarly, the network behavior of a token may dictate its cryptographic design, such as the procedure by which the token is paired with a mobile, the nature of the resulting shared key, and the cryptographic protocol used to transmit authentication information.

For example, if a token t is promiscuous, then it might use the same encryption key for all mobiles. Preferably, though, the token could derive unique token-mobile encryption keys dynamically. In this case, the token may employ on-the-fly harvesting of the identification and network configuration data of nearby mobile devices, such as their MAC addresses. It can then derive an encryption key $K_{t,m}$ for each mobile m by, e.g., applying a key-derivation function to a master secret and m's MAC address. If a token derives keys dynamically in this way, then the token-mobile pairing process need simply configure mobile m with $K_{t,m}$. Only a mobile m with knowledge of $K_{t,m}$ is then able to receive the promiscuously broadcast authentication information of the token, such as encrypted tokencodes.

As noted above, a given token may be configured to accept direct user input, for example, via a control button 208. Such input can be valuable in a pairing protocol by, for example, allowing the user to signal the intention to pair or to confirm the correctness of a displayed value.

In a token that accepts user input for other purposes like data-origin authentication, this interface could be re-purposed for initialization, especially when supported by a key-distribution infrastructure for the mobile. Assume that a token and an authentication server are pre-provisioned with a symmetric key k. Then to initialize the token's use with a new mobile, the user could key-in identifying and network-configuration data corresponding to the mobile. This data is often much shorter than a cryptographic key, and could be used with k to bootstrap the new connection, taking the assumption that the attacker isn't eavesdropping on this channel. For instance, in an illustrative embodiment, a 48-bit MAC address plays both identification and network-configuration roles. The token can then use a simple key derivation function (KDF) like $H(k, ID_m)$ to uniquely derive a key for this relationship, where $H( )$ denotes a cryptographic function. For its part, the mobile can request $H(k, ID_m)$ from the server.

The user is implicitly trusted because of physical presence. It is possible that an attacker could borrow the token and perform the same steps, pointing to a need for the possibility of a second factor not only in the overall user-authentication decision but also for the token to accept a new pairing assignment.

As indicated above, a given mobile may comprise, for example, a laptop, mobile telephone, handheld game system, or other portable electronic device. Each of these offers a user interface more robust than that of a typical authentication token. Any of a number of pairing protocols with key confirmation can achieve key establishment secure against man-in-the-middle attacks. See, for example, J.-H. Hoepman, "The ephemeral pairing problem," in Financial Cryptography '04, Lecture Notes in Computer Science, pages 212-226, Springer-Verlag, 2004. Such pairing protocols rely on a confirmation procedure whereby the user ensures that the two devices arrive at identical checksums. To ensure secure pairing, the user can key into the mobile a code that is pre-printed or displayed on the token, or else compare a displayed value on the token with one on the mobile.

As mentioned previously, bidirectional communication between the token and the mobile may be used for initial pairing. By way of example, the token can establish an ad hoc 802.11 connection with the mobile, temporarily breaking any existing wireless connection of the mobile. The token can then record the MAC address of the mobile while furnishing the mobile with a shared encryption key, or taking the KDF approach described above. The token and mobile may exchange messages, for example, sending identifying data for use in the KDF scheme, directly sending a key in the clear, or using a key-exchange mechanism.

It is possible to use a public-key algorithm like Diffie-Hellman with public-key certificates to establish identity, although such an approach is computationally intensive and cannot definitively confirm that the two devices are the particular devices the user wants to pair at a given point in time.

Symmetric-key arrangements may alternatively be used. As a simple example, the mobile and token could generate and transmit random strings $R_m$ and $R_t$, respectively. Each then takes the XOR of the two strings to derive a shared key $K_{tm}$. If the token, for instance, has a shorter broadcast range than the mobile, this approach could modestly reduce the range at which a passive attacker could operate. To thwart active attackers, the token and mobile could both display the hash of the shared key for confirmation by the user.

A trusted server may be made available during pairing. For example, the above-described simple symmetric-key protocol may be expanded to allow for explicit server authorization of token-mobile pairing with only two messages over the air. The token could compute $R_t = H(K_{ts}, T_t)$ where $K_{ts}$ is a key shared by the mobile and server, and $T_t$ is a counter or the current time of day. Using an authenticated and encrypted channel, the mobile passes its own identity $ID_m$, the identity $ID_t$ of the token, a nonce $R_m$, and $R_t$ along to the server. The server verifies $R_t$, and computes $A_{st} = H(K_{ts}, T_t, ID_m)$ and $K_{tm} = H(K_{ts}, T_t, ID_m, R_m)$, both for conveyance to the mobile. Then, the mobile passes $R_m$ and $A_{st}$ along to the token, which verifies the server's hash and computes $K_{tm}$. As above, the token and mobile could display the hash of $K_{tm}$ for confirmation or rejection by the user.

Device pairing may alternatively be based on physical proximity or contact between the token and the mobile. This physical presence is assumed to be sufficient authorization for pairing. See, for example, F. Stajano and R. Anderson, "The resurrecting duckling: Security issues for ad-hoc wireless networks," in 7th International Workshop on Security Protocols, vol. 1796 of Lecture Notes in Computer Science, pages 172-194, Springer-Verlag, 1999. For example, the token might carry a USB interface which, when plugged into a mobile, generates and installs keys in the two devices. The USB interface can also support installation of any needed software on the mobile, including any application-level, special-purpose software that may be required. Moreover, use of a USB interface allows two-way communication, thereby allowing the token to receive network-configuration data while also allowing a broader range of pairing protocols without altering the essential one-way nature of the wireless authentication protocol.

Though powerful and flexible, a USB interface increases device cost and can pose usability problems. Many computers are physically situated so that their USB ports are not easily accessible, and others may have no USB ports to spare. Also, users may need to be trained that a wireless token needs to be inserted into the computer once for initialization, but not thereafter.

A number of additional examples of pairing protocols in accordance with embodiments of the present invention will now be described. Each of these exemplary protocols may be implemented using a wireless authentication token having an output-only network layer, although it will be apparent that such a configuration is not required for implementing the protocols.

Protocol with Trusted Key-Establishment Server and User-Directed Access Control

In this protocol, the user directly authorizes a mobile to pair with the token. Network-configuration data for device x is represented by the MAC address $MAC_x$, though other identifying data could be used. Before the protocol, the token already possesses the secret seed needed to generate $K_{t,m}{}^i$ by means of a key derivation function.

1. The user renders the mobile discoverable.
2. The user begins the pairing program on the mobile.
3. The user clicks three times (or otherwise signals intention) on the token, indicating that the token should pair.
4. The token transmits $MAC_t$, along with a flag that indicates that this is a pairing message. Now the mobile knows the token's MAC address.
5. The user enters a tokencode (e.g., from the token LCD screen) to the pairing program on the mobile. This tokencode is only for pairing: it cannot serve as an ordinary tokencode, nor can an ordinary tokencode serve as a pairing tokencode.
6. The mobile sends the tokencode and token identity to a server, which verifies that the code and identity match for the current time period i. $K_{t,m}{}^i$ is given to the mobile.
7. If the token is promiscuous, the procedure is complete.
8. Otherwise, the mobile sends ($MAC_m$, $HMAC_{K_{t,m}{}^i}$ ($MAC_m$)) to the token. Although there is no immediate security need for this step, it is good practice to ensure that the list of qualified mobiles is authentic. Intuitively, the mobile sends its MAC address to the token along with some authenticator that assures the token that the mobile is authorized by the server to pair with it.
9. The token verifies the authentication code and stores the MAC address, then displays "OK" on its display.

Protocol with Trusted Key-Establishment Server and Server-Directed Access Control In this protocol, the server determines whether a given mobile is authorized to pair with the token.

1. The user renders the mobile discoverable.
2. The user begins the pairing program on the mobile.
3. The user clicks three times (or otherwise signals intention) on the token, indicating that the token should pair.
4. The token broadcasts $MAC_t$, along with a flag that indicates that this is a pairing message. Now the mobile knows the token's MAC address.
5. The mobile sends $MAC_t$ to the server and requests a pairing key.

6. If the server authorizes the mobile to pair with the token, it returns $K_{t,m}{}^i$ to the mobile.
7. If the token is promiscuous, the procedure is complete.
8. Otherwise, the mobile sends ($MAC_m$, $HMAC_{K_{t,m}{}^i}$ ($MAC_m$)) to the token.
9. The token and mobile each display a confirmation code, e.g., the last four digits of $H(K_{t,m}{}^i)$. The user may perform a visual comparison. This helps protect against active attack as well as user or machine error.

It is to be appreciated that the above pairing protocols are presented by way of example only, and other embodiments can use alternative operations. Authentication and encryption protocol examples will be described in greater detail below.

Authentication Architectures

A given wireless authentication token 102 may be, for example, event-based or time-based. Such a token can record time as a function either of the number of outputs it has emitted or of an internal, continuously running clock. The advantage of event-based timekeeping is that it may be implemented using only a counter; the token need not maintain a continuously-running clock. Event-based emissions, however, are vulnerable to replay. If an adversary intercepts a token output that the mobile fails to receive, the adversary can successfully replay the intercepted output until the token makes its next successful authentication to the mobile. In contrast, the outputs of conventional time-based tokens typically expire within a short window of time, e.g., one minute. A wireless authentication token could be configured to have tokencode expirations of a few seconds, limiting the opportunity of the adversary.

As a more particular example, the wireless authentication token 102 may be configured as a wireless variant of an otherwise conventional SecurID® authentication token. In a typical conventional SecurID® system, a token shares a unique secret key $x_A$ with an authentication server. At time T, the token computes a tokencode $c_T = f(X_A, T)$, where $f$ is a one-way function based on 128-bit Advanced Encryption Standard (AES). This tokencode $c_T$ is typically displayed on the token as a six-digit code that the user types into the keyboard of a personal computer for transmission to the authentication server. The user also types a supplementary, user-specific PIN, typically four digits in length. By default, the time T has one-minute granularity, although the system compensates for clock-skew and typing delays by allowing the server to accept tokencodes corresponding to slightly inaccurate times.

In a wireless variant of the above-described SecurID® token, protection against tokencode interception is provided by encrypting token emissions under a symmetric encryption key $X_E$ shared between the token and the mobile. That is, the token emits $e_{x_E}[c_T]$ at time T, where e is a suitable cipher. Of course, a token emission is subject to replay; expiration of tokencodes already aims to prevent such attacks. Software on the mobile permits receipt and decryption of the tokencode $c_T$ and can automatically pass it to appropriate applications.

This simple wireless system offers a number of advantages over ordinary SecurID® tokens. There is, of course, the heightened user convenience offered by the elimination of tokencode entry. Additionally, however, it is possible to transmit longer tokencodes, achieving stronger authentication without encumbering the user.

The various pairing protocols described herein can support a wide variety of token configurations, including both event-based and time-based tokens, as well as tokens with user activation and those with continuous emission.

It is possible for a symmetric-key token to authenticate itself to a server through the agency of the mobile using public-key techniques. In particular, in conjunction with a mobile device, a symmetric-key token can support authentication to any of a collection of servers that do not have a trusted relationship.

An exemplary model of a public-key-based system in which both the token and the mobile serve as authentication factors will now be described. Such systems are referred to herein as joint-authentication systems.

An authentication system in this model comprises a set of functions AS={KeyGen, Mobile, Server, Token} defined as follows:

KeyGen $(l,d) \rightarrow K_t^{(0)}, K_m^{(0)}, K_s^{(0)}$: The key-generation function takes as input a key-length parameter l and a security parameter d that defines time-granularity in the system. KeyGen outputs initialization keys for the token, mobile, and server respectively.

Token $(K_t^{(j)}, T) \rightarrow (K_t^{(j+1)}, k^{(j+1)})$: The token takes as input a current token key $K_t^{(j)}$ and the current time T, and outputs a new key, $K_t^{(j+1)}$, along with a new tokencode $k^{(j+1)}$. In an event-based token, T may be a simple counter, omitted, or ignored.

Mobile $(M, T, K_m^{(i)}, k) \rightarrow (C; \tilde{K}_m^{(i+1)})$: The mobile function takes as input a message M; this might be a message to which the mobile applies a digital signature or a random challenge issued by a server. It also takes as input the current time T, the current mobile key $K_m^{(i)}$ and a tokencode k. Mobile outputs a response C and a new mobile key $K_m^{(i+1)}$. In case of invalid input, the function outputs a special value $\phi$.

Server $(C, K_s^{(r)}, k) \rightarrow (v=\{0, 1\}, K_s^{(r+1)})$: The server function takes as input a value C, as well as a current server key $\tilde{K}_x^{(r)}$. It yields a bit value v, where '1' signifies "accept" and '0' signifies "reject." It also outputs a new server key $K_x^{(r+1)}$.

In the normal course of operation, the token outputs a tokencode k. The mobile takes this tokencode as input, along with supplementary inputs M and T, and outputs a value C, representing the combined authentication information of the token and mobile. The server verifies the correctness of C.

As a simple example, consider a system in which a time-based token holds a private key SK whose corresponding public key is PK. The token outputs a digital signature $c_T = (\Sigma_{SK}[T], T)$ of the current time T. The mobile has an analogous key pair (SK', PK'); on receiving $c_T$, it outputs a digital signature $C = (\Sigma_{SK'}[c_T], c_T)$. The server holds PK and PK'. It accepts mobile output $C = (\Sigma_{SK'}[c_T], c_T)$ only if T is current and both digital signatures are valid.

A Simple Encryption-Based Approach

An elementary joint-authentication protocol assigns a digital signing key SK to the mobile, with the server storing the corresponding public key PK. The mobile stores SK in encrypted form. When it receives a tokencode $k^{(j)}$, it decrypts SK for authentication to the server. The mobile can digitally sign the current time or a server-issued challenge. The mobile immediately then encrypts SK in such a way that it can be decrypted using future tokencodes from the token. Encryption-based protocols will be described in greater detail below. The encryption-based approach is typically most useful for event-based tokens.

Although a naïve encryption-based approach can achieve joint-authentication security in some sense, it lacks forward security even when the underlying encryption scheme itself is forward-secure. For example, if an adversary compromises SK, then it can impersonate the mobile in all future timesteps.

One way of achieving forward security is simply to have the mobile refresh its signing keys. In particular, the mobile is initialized with private key $SK^{(0)}$ and the server with public key $PK^{(0)}$. On its $i^{th}$ authentication to the server, the mobile generates a new key pair $(SK^{(i+1)}, PK^{(i+1)})$, and transmits a digital signature $$\sum_{SK^{(i)}} (PK^{(i+1)})$$

on its new public key to the server. In this way, transient compromise of the mobile signing key is subject to detection. The key records of the mobile and adversary will diverge: If one entity registers a new public key, the other entity will be rendered unable to produce a fresh authentication. Thus a valid, stale authentication can alert a server to potential compromise of the mobile. Additional details regarding this type of key insulation approach can be found in G. Itkis and L. Reyzin, "Intrusion-resilient signatures, or towards obsoletion of certificate revocation," in Advances in Cryptology—CRYPTO '02, Springer-Verlag, 2002.

Of course, compromise of the current key $SK^{(i)}$ still permits an adversary to impersonate the token and mobile at will until another, valid authentication attempt alerts the server to the compromise. The next proposed approach addresses this weakness.

A Hash Chain Approach

In this approach, we define an epoch as a sequence of d token values, where an epoch can be either time-based or event-based. With each epoch is associated a hash chain, whose images the token releases one by one. The mobile possesses a certificate for each epoch. To achieve joint authentication, the mobile employs the private key of its certificate in conjunction with hash images realized by the token.

Let $c_i$ denote a hash chain of length d associated with epoch i. Let $c_i^{(j)}$ denote the $j^{th}$ value in the chain such that $c_i^{(0)}$ represents the head of the chain and $c_i^{(d)}$, the tail. That is, for a suitable one-way hash function $f$, we have $c_i^{(j)} = f(c_i^{(j+1)})$. Let $(SK^{(i)}, PK^{(i)})$ represent a key-pair for epoch i, with $SK^{(i)}$ stored by the mobile. A certificate $\Gamma_i$ (issued by the appropriate authority) contains the public key $PK^{(i)}$ as well as the head $c_i^{(0)}$ of the hash chain $c_i$.

Key Generation: A master private/public key pair (SK*, PK*) is generated. (This may be the key pair of a participating authority.) For a system-lifetime parameter W, keying material is generated for each epoch i in $1 \le i \le W$, in particular: (1) A hash chain $c_i$; (2) Private/public key pair $(SK^{(i)}, PK^{(i)})$; (3) A certificate $C_i = (c_i^{(0)}, PK^{(i)}, \Sigma_{SK^*}[c_i^{(0)}, PK^{(i)}])$. A token/mobile secret key $x_A$ is also generated.

The token stores the tail of each hash chain (or, as an optimization, a single master seed), as well as $x_A$. The mobile stores the set of keys $\{SK^{(i)}\}_{i=1}^{W}$ and $x_A$. The server stores $\{C_i\}_{i=1}^{W}$.

Token-Only Authentication: In timestep j of epoch i, the token emits value $c_i^{(j)}$. The server can verify the correctness of this pre-image by hashing $c_i^{(j)}$ j times to obtain $c_i^{(0)}$ and then checking this value against the certificate $C_i$.

Token-Mobile Joint Authentication: On receiving $c_i^{(j)}$ from the token on a channel encrypted under $x_A$, the mobile signs it using $SK^{(i)}$, i.e., outputs $$\left( c_i^{(j)}, \sum_{SK^{(i)}} c_i^{(j)} \right),$$

where $\Sigma$ in this context denotes signing. If the token is to be used alternatively in a freestanding mode, then it is important to protect $c_i^{(j)}$ against compromise. In this case, the mobile may communicate its output to the server on an encrypted channel.

Resource Requirements: To amortize computational costs, the token may compute values in the hash chain for epoch i+1 as it releases those for epoch i. In this case, the token performs one hash computation per time step, and its storage requirement is that for d hash images. The certificates and keys for this system require considerably more storage on the mobile device.

As an example, consider a time-based token with a fine time-interval granularity, namely one second. Suppose that an epoch consists of 100 hash values, and that a hash image is 160 bits (20 bytes) in length. In this case, the token requires 2 k bytes of storage. To support a token that lasts for five years, a mobile would need 1,576,800 certificates. Assuming use of short, elliptic-curve-based signatures, each certificate and associated key would occupy 40 bytes. The mobile could derive the head of a hash chain from any of its pre-images. Thus, the total memory requirement would be just over 63 MB on the mobile.

It should be noted that Merkle trees can serve as an alternative to hash chains in this approach. Also, the fractal technique disclosed in M. Jakobsson, "Fractal hash sequence representation and traversal," in Proceedings of the 2002 IEEE International Symposium on Information Theory (ISIT '02), pages 437-444, 2002, can serve as an optimization for ordinary hash chains, although it is unlikely to yield substantial benefits for smaller chains.

In a temporarily fine-grained system, the token could display just the head of the hash chain, i.e., the backup authentication method would resolve only to the granularity of an epoch.

An Elliptic-Curve Approach

If the token has the resources to do lightweight public-key operations, such as elliptic curve multiplication, an alternative approach is possible. In this approach, the token derives a base point $G^{(T)}$ from the current time T. It multiplies this base by its private key $SK_t$, effectively generating a signature on T. Using a pairing operator, for example, as described in D. Boneh and M. Franklin, "Identity-based encryption from the Weil pairing," Lecture Notes in Computer Science: Advances in Cryptology—CRYPTO 2001, 2139, 2001, the correctness of this signature may be checked against a public key for the token. By extension, the token and mobile together may compute a Diffie-Hellman key on the base $G^{(T)}$; pairings again permit an implicit check of correctness.

Let capital letters denote points on a suitable elliptic curve E with order q, and lower case letters denote integers in field $F_q$. Let $G^{(T)}$ be a publicly computable point derived from application of a suitable one-way function to T, the current time at a standardized level of granularity. Alternatively, $G^{(T)}$ can be computed based on a message to be signed. Let H be a publicly, pre-established, randomly selected point on E. Let ê be the pairing operator as defined in Boneh-Franklin over E×E.

Key Generation: The token is programmed with random secret $SK_t \in F_q$. Its corresponding public key is $PK_t = SK_t H$. The mobile device is programmed with $SK_m$. It shares a joint public key $PK_{t,m} = SK_t SK_m H$ with the token. The server may store one or both public keys.

Token-Only Authentication: At time T, the token emits $K_t^{(T)} = SK_t G^{(T)}$. The correctness of $K_t^{(T)}$ may be checked via the equality $ê(K_t^{(T)}, H) = ê(G^{(T)}, PK_t)(= ê(G^{(T)}, H)^{SK_t})$.

Token-Mobile Joint Authentication: The mobile computes $K_{t,m}^{(T)} = SK_m SK_t G^{(T)}$ on receiving $K_t^{(T)}$. This serves as a proof that the mobile learned the token value $K_t^{(T)}$. The correctness of $K_{t,m}^{(T)} = SK_m SK_t G^{(T)}$ may be verified via the equality $ê(K)_{t,m}^{(T)}, H) = ê(G^{(T)}, PK_{t,m})(= ê(G^{(T)}, H)^{SK_m SK_t})$.

Resource Requirements: The main computational burden for the token and mobile is a single elliptic-curve multiplication. Pairing computation is computationally intensive (equivalent roughly to an RSA decryption), but need be performed only by the verifier. Note that computation is only required at the time of authentication; there is no need for persistent state updates.

One very attractive feature of this protocol is the way it masks the identity of the token. In particular, multiple tokens can be coupled with the mobile in such a way that any will enable the mobile to complete its authentication successfully without revealing which token it interacted with. The mobile need merely store ratios of token secrets.

Note that a mobile device may be provisioned with the joint public key $PK_{t,m}$ using knowledge of $SK_m$ and $PK_t$ alone. No modification to the token is required for joint authentication with a mobile device. Moreover, multiple mobile devices may be provisioned simultaneously with joint-authentication certificates for the same token.

Assuming a shared initial secret key $y_0$ between the token and mobile, it is possible to create a funkspiel channel. See J. Håstad et al., "Funkspielschemes: An alternative to conventional tamper resistance," in Seventh ACM Conference on Computer and Communications Security, pages 125-133, 2000. Let $y_{i+1} = f(y_i)$ for a suitable one-way function $f$. At time t, the token emits $E_{y_T}[k^{(t)}]$, and replaces $y_T$ with $y_{T+1}$, where E is a suitable encryption function. If tampered with, the token replaces $y_{T+1}$ with $y_{T+2}$, for example; this induces a desynchronization that is easily checked by the mobile device.

The mobile can compute the joint public key on the fly (if it's not cached). It can do so given a token's public key. The joint key is checkable by anyone, using, for example, Decision Diffie-Hellman (DDH) verification.

Encryption Architectures

A wireless authentication token may be configured to facilitate encryption capabilities on the mobile device. The mobile might encrypt sensitive files automatically after a certain idle period, for example, when a screensaver appears. Alternatively, the user might explicitly activate a lockdown functionality using a special button on the token or a key sequence on the mobile.

For the greatest convenience, the user should be able to decrypt files on the mobile device by clicking the same button on the token as she uses to authenticate herself. Ideally, the user should merely perceive the token as "locking" and "unlocking" sensitive resources. The system can abstract away the notions of authentication and encryption.

In a simple architecture, the token could output the same encryption/decryption key on every button-press. As the token-mobile channel is encrypted, this key would not be vulnerable to direct eavesdropping. To prevent replay attacks, the key could be accompanied by a timestamp or counter. Before decrypting, the mobile would verify the freshness of the timestamp or counter. The problem with this approach is its lack of time-insulation. An attacker that intercepts a single token emission at any time and gains access to the laptop at any time can successfully decrypt the contents of the laptop. To restrict this broad adversarial power, the encryption/decryption key emitted by the token may change over time, for example, in every time step.

Changing keys may present desynchronization issues in an output-only token. Suppose, for instance, that the token emits a new encryption/decryption key in every time step, and that the mobile device encrypts its contents under the next key to be emitted by the token. If the user presses the button on her token while she is out of range of the mobile device, the token and mobile will become desynchronized. In other words, the token cannot decrypt the contents of the mobile because the encryption keys employed by the mobile are now stale in the view of the token.

To alleviate the problem of desynchronization, the mobile device may perform encryption under a sequence or window of d future token keys. For example, the mobile device might encrypt under the next d=10 keys to be emitted by the token. Only if the user then activates the token ten times out of range of the mobile, then, will desynchronization occur. This approach of windowing, of course, means that an adversary that has gained access to the mobile device can in general successfully decrypt its contents by intercepting any of the next ten token outputs. Windowing imposes a fundamental tradeoff: Larger values of d diminish the risk of desynchronization, but increase exposure to an adversary.

Simple Encryption

A simple approach to encryption is for the mobile to store the initial token key $K_t^{(0)}$, as well as a private/public key pair (SK, PK) which may be either persistent or ephemeral. For simplicity, we assume here that any tokencode $k^{(j)}$ for token time j may be efficiently computed from $K_t^{(0)}$. The operations of encryption and decryption are then as follows:

Encryption: The mobile receives a counter value from the token or otherwise determines the current token counter (e.g., time) value j; the mobile may additionally take as input a plaintext value M. It then does the following:

1. The mobile encrypts the pair (SK, $K_t^{(0)}$) under future tokencodes $k^{(j+1)}, k^{(j+2)}, \ldots, k^{(j+d)}$ using $K_t^{(0)}$, i.e., it creates d independent key-encapsulating ciphertexts $C_{j+1}, C_{j+2}, \ldots, C_{j+d}$.

2. The mobile erases any plain text instantiation of SK, but retains PK in plaintext form.

3. The mobile creates a ciphertext C by encrypting M under PK. As we explain below, C is subject to updates between encryption operations on SK.

Decryption: Taking the current tokencode $k^{(j)}$ as input, the mobile attempts to decrypt each of its currently stored key-encapsulating ciphertexts. If successful on one of them, it recovers (SK, $K_t^{(0)}$) and also decrypts C.

In a typical operational environment, we expect that management of the ciphertext C would be partially independent of the mobile's ordinary encryption operation as outlined above. In particular, we expect that the mobile, after receiving a tokencode $k^{(j)}$, and decrypting SK and M, would then immediately perform its encryption operation for counter valuej. In other words, after decrypting M, the mobile would immediately re-encrypt the keys SK and $K_t^{(0)}$ so as to minimize their exposure.

PK can serve subsequently to encrypt M, potentially after updating it, whenever desired. For example, if the user "locks" the mobile, either by activating her token, entering a keystroke sequence, or leaving her mobile unused for a period of time, the mobile can encrypt M under PK. M may be a collection of files or passwords, or even portions or the whole of a hard disk.

Forward Security

The simple approach we have just described does not achieve forward security. Once an adversary observes the mobile in its decrypted state and therefore compromises the token seed $K_t^{(0)}$ (or an updated version thereof), the adversary can successfully simulate the token and attack the mobile at any future time.

To achieve forward security, a more sophisticated approach to encryption may be used, as outlined in the following example.

Example 1

To meet tight bandwidth constraints, a token might perform windowing by emitting two keys, k and k̂. The token refreshes the first key at time steps d, 3d, 5d, . . . and the second key at time steps 2d, 4d, 6d, . . . In other words, we employ two, gradually rotating keys with overlapping intervals. This compact scheme creates a synchronization window of size at least d, and provides a good degree of time insulation, as keys change on a regular basis. It fails, however, to achieve strong encryption. An adversary can potentially intercept a token output first and then compromise the mobile.

Formally, an encryption system in this model comprises a set of functions ES={KeyGen, Enc, Dec, Token}, defined as follows:

KeyGen(l)→($K_t^{(0)}$, $K_m^{(0)}$): The key-generation function takes as input a security parameter l. It outputs initialization keys for the token and mobile devices respectively.

Enc(M, $K_m^{(i)}$, k)→(C; $\tilde{K}_m^{(i+1)}$): The encryption function takes as input a plaintext vM, a current mobile key $K_m^{(i)}$ and a supplementary token output k. It yields a ciphertext C and a "locked" mobile key. If encryption fails, the function outputs a special value $\phi$.

Dec(C, $\tilde{K}_m^{(i)}$, k)→(M; $K_m^{(i)}$): The decryption function takes as input a ciphertext C, as well as a current "locked" mobile key $\tilde{K}_m^{(i)}$. It yields a plaintext M as well as a new mobile key $K_m^{(i)}$. If decryption fails, the function outputs a special value $\phi$.

Token($K_t^{(j)}$)→($K_t^{(j+1)}$, $k^{(j+1)}$): The token takes as input a current token key $K_t^{(j)}$ and outputs a new one, $K_t^{(j)}$, along with a new tokencode $k^{(j+1)}$.

We will now describe two exemplary encryption protocols. The first requires only symmetric-key primitives. The second is similar to the previously-described public-key-based authentication, and relies on pairings over elliptic-curve groups.

Symmetric-Key Variant

The symmetric key variant is similar in spirit to the simple scheme in Example 1 above. To strengthen the scheme, however, we do not use keys that remain static over intervals of 2d time steps. Instead, we use hash chains of length 2d; successive hash chains overlap in d time steps. Let h represent a suitable one-way function (e.g., a hash function), and $h^{(i)}$ represent i successive applications of h. The scheme is as follows. As the KeyGen function is straightforward in view of the previous description, it will not be described in detail here.

Token: At time step 2zd for positive integers z, the token generates a fresh, random l-bit key k. The token computes $\{k^{(j)}=h^{(z+2)d-j-1}(k)\}_{j=zd}^{(z+2)d-1}$, i.e., a hash chain of length 2d. At timestep (2z−1)d for positive integers z, the token analogously computes values $\hat{k}^{(j)}$, $\{\hat{k}^{(j)}=h^{(z+2)d-j-1}(\hat{k})\}_{j=zd}^{(z+2)d-1}$. At timestep j, the token outputs the pair ($k^{(j)}$, $\hat{k}^{(j)}$).

Enc: On receiving the current token output ($k^{(j)}$, $\hat{k}^{(j)}$), the mobile generates a fresh private/public key pair ($SK^{(j)}$, $PK^{(j)}$). It computes the pair $E=(e_{k^{(j)}}[SK^{(j)}], e_{\hat{k}^{(j)}}[SK^{(j)}])$ and stores (E, PK). The mobile then erases all other secrets. Any sensitive files may now be encrypted under PK.

Dec: On receiving the current token output ($k^{(j)}$, $\hat{k}^{(j)}$), the mobile attempts to decrypt E using keys in $\{h^{(i)}(k^{(j)}), h^{(i)}(\hat{k}^{(j)})\}_{i=0}^{2d-1}$. The mobile may try keys in increasing order of i; alternatively, if the token outputs j, the mobile can directly determine how to derive the necessary keys.

This scheme supports a synchronization window of size at least d in any time step.

A number of optimizations may be achieved, as follows. Given storage 4d, the token computations may be amortized to achieve an average load of two hash functions per timestep. Let $c^{(m)}, c^{(m+1)}, \ldots, c^{(m+2d-1)}$ denote the element of a given chain of length 2d released across timesteps m to m+2d−1. In timestep m−z, for $1 \leq z \leq 2d$, the token computes and stores $c^{(m+z-1)}$. That is, the token computes and stores the full chain one timestep at a time, starting at the tail. Whenever an element in a hash chain is output, the token releases the associated memory slot.

We can achieve a further reduction in storage to 2d+1 with no increase in computation through a small adjustment to the structure of a chain. In particular, we let the first d elements each be independently derived from the (d+1)st element of the chain. For example, we let $c^{(m)}=h(c^{(d+1)}\|1)$, $c^{(m+1)}=h(c^{(d+1)}\|2), \ldots c^{(m+d)}=h(c^{(d+1)}\|d)$. We refer to this as a "frayed" hash chain. Observe that the "frayed" part of a chain, i.e., the first d elements, can be derived from any of the "unfrayed" elements, i.e., the last d elements. Briefly, then, successful encryption and decryption hinges on the following invariant: In any timestep, the token outputs an element from the "unfrayed" part of one of the two currently active, overlapping hash chains. Using frayed hash chains, we can cut our storage effectively in half. Rather than storing elements in the frayed part of a chain, the token can compute them on the fly. Thus the token requires storage 2d for unfrayed elements, and an additional slot for its on-the-fly computation.

Of course there are many possible variants involving more than two overlapping hash chains and different resource tradeoffs. With no constraints on computation and bandwidth, for example, each key $k^{(j)}$ can be independent, and in time step t, the token can simply output $\{k^{(j)}\}_{j=t}^{j+d}$.

Public-Key Variant

We will now describe a public-key encryption scheme that relies on a form of identity-based encryption (IBE). Very simply, we associate with each timestep j (rather than each entity) a unique "identity" known to both the mobile and the token. This identity can simply be the integer value j. The system thereby associates a public-private key pair $(PK^{(j)}, SK^{(j)})$ with each timestep j.

In this arrangement, the mobile can compute $PK^{(j)}$ for any desired timestep, including future ones, without knowledge of any private keys. It suffices for the mobile to combine system parameters with the "identity" j. The mobile therefore can independently encrypt files under future key pairs, e.g., under a window of d successive, future keys. The token, then, plays the role of the Private Key Generator (PKG), and manages the system secrets. In each timestep j, the token releases the private key $SK^{(j)}$.

Document Signing

Whereas traditional SecurID® authentication focuses on general user authentication for computer login, some applications require explicit authentication of particular data in a process typically called document signing. In order to authenticate the origin of this data, one can require that the wireless token be present.

We will describe below several approaches to the problem of token-assisted document signing. The variables under consideration principally focus on a few factors, namely, how to include evidence of a token's proximity into a digital signature, what effect this has on existing digital signature infrastructure, and what communications take place between the mobile and the token.

One-Way Transmission, Standard Signatures. As described above, a wireless authentication token in an illustrative embodiment emits periodic time-varying authentication information. Perhaps the easiest way to include evidence of token presence in a signature is simply to append the most recently received authentication information from the token to the data to be signed. The existing digital signature infrastructure could be used to verify this ordinary digital signature. But additional software support may be required to verify the appended authentication information.

One-Way Transmission, Custom Signatures. In order to save battery life, we may want to reduce the duty cycle of the token as much as possible. As indicated previously herein, one way to do this is to make it an output-only device. The standard equations for digital signatures are then revised to include authentication information sent by the token. The resulting signature could not have been produced by either the token or mobile alone. This property adds some additional security: simply stealing one's token or one's mobile is not enough for an attacker to produce fraudulent signatures. The difficulty with this approach is that the resulting signature does not follow established standards and may therefore require a custom infrastructure for verification.

Two-Way Transmission, Standard Signatures. Another approach is to transmit a document or the hash of a document to the token to be signed. To conserve battery life, the token may briefly switch its receiver on after transmitting authentication information for an indication from the mobile that there is data to be signed. For example, a reactive token may listen for probe requests to discover which mobiles should receive tokencodes. Though custom software drivers might be required, in principle one could append arbitrary information elements to the probe request to carry the data to be signed.

The token may alternatively switch its receiver on only when the token holder presses a button for this purpose. The token then becomes an ordinary station in the wireless network. Although doing so presents an additional administrative burden, users in specialized environments might find this service valuable. It attempts to associate with the access point most likely used by the mobile by measuring signal strength. This particular method works not only for signatures but for general bidirectional communication. For this reason, a variety of security protocols could be implemented. Because of the stack of networking protocols involved, this button press may initiate the following sequence of actions:

1. Activate 802.11 radio.
2. Scan for access points, either passively or actively.
3. Determine signal strength of discovered access points.
4. Associate to the access point of highest strength, or the access point named in a previous provisioning step, described below.
5. Obtain an IP address using a protocol such as DHCP or bootp.
6. Send this IP address along with a port number to the mobile using a beacon or probe response frame, as described above. Instead of simply sending the tokencode as described above, the token sends its IP address and a port number either along with or instead of the tokencode.
7. Listen for data from the mobile for a predetermined interval of time.
8. Process incoming data, if any.
9. Disassociate from the access point either explicitly, or simply by turning the radio off.

The mobile receives a message from the token including its IP address. The mobile can then open an ordinary TCP or UDP connection to the token, sending either the data to be signed, its hash, or the datagrams of some other security protocol. To sign data, the token can either immediately perform the signature and return the result, or require some user action to signal explicit consent. The token can optionally display the data, part of the data, the hash, or part of the hash. The user can optionally assent to the signature by pressing a button or providing a biometric sample. This action causes the token to perform its signature, or generate a datagram of some other security protocol. Any data signed could be retained on the token for later display or audit.

Two-Way Transmission, Out-of-Band Verification, and Custom Signatures. Digital signature systems have historically been beset by a fundamental problem: the lack of direct agency on the part of a user. The user is relying on computing hardware to not only correctly calculate a signature while not revealing the private key, but also to sign the correct data. Given the many layers of software running on a modern computer, it is not hard to imagine a scenario where a particular document is displayed on screen for approval before signature, but a modified document is actually signed. To counter this avenue of attack, the token can gain some out-of-band capability.

For example, the token can share the perception of the user with regard to the data to be signed, or "see what the user sees." More particularly, the token could include a digital camera that captures an image to be additionally signed. Or as an alternative, we know that display technologies are increasingly becoming wireless themselves. The token could monitor wireless communications between a mobile and its associated display so that once again it is able to share the perception of the user.

As another example, the token could include some geolocation capability such as GPS. The token's location could provide some corroborating evidence in the event of subsequent dispute.

The illustrative embodiments described above provide a wireless authentication token that operates using existing 802.11 capabilities of computers and other processing devices. More particularly, these embodiments provide a new communication protocol that tunnels authentication information through 802.11 management frames. In addition to providing protocols for authentication, the illustrative embodiments provide protocols for encryption of authentication information transmitted by the token, and protocols for support of encryption on a computer.

It should again be emphasized that the particular wireless authentication techniques described above are provided by way of illustration, and should not be construed as limiting the present invention to any specific embodiment or group of embodiments. For example, as previously noted, the described embodiments may be adapted in a straightforward manner to operate with protocols other than 802.11, utilizing other field and frame formats to communicate authentication information or other types of information. Also, the particular configuration of system elements shown in FIGS. 1 and 2, and their interactions as shown in FIG. 3, may be varied in other embodiments. Moreover, the various simplifying assumptions made above in the course of describing the illustrative embodiments should also be viewed as exemplary rather than as requirements or limitations of the invention. These and numerous other alternative embodiments within the scope of the appended claims will be readily apparent to those skilled in the art.

APPENDIX

As indicated above, further details regarding the illustrative embodiment of FIG. 3, as well as other related alternatives and variants, will be provided in this Appendix. These particular embodiments deal with implementation using the 802.11 standard, and the table structures and contents shown are generally as specified in that standard. The wireless authentication token and computer referred to in this Appendix may be viewed as respective elements 102 and 104 of the system 100 shown in FIG. 1. It is to be appreciated that the details presented herein are by way of illustrative example only, and should not be construed as limiting the scope of the invention in any way.

An 802.11 access point divides time into periods called superframes. In each superframe, several ordinary directed data frames may be sent. The protocol does include a mechanism for a station to periodically sleep, but it typically requires all stations to run their transceivers for a fixed duration of time in each superframe.

An 802.11 access point advertises its existence by sending frames to a broadcast address. The illustrative embodiment of FIG. 3 provides a wireless authentication token that mimics an 802.11 access point in order to deliver authentication information to a computer. Instead of remaining continuously connected, the token mostly sleeps in a low-power state with its radio turned off. At certain intervals, e.g., every second or two, it wakes up, turns its radio on, and sends a frame to the broadcast address. Any network interface cards within the token's radio sphere of influence will receive the broadcast frame. A number of exemplary frame formats suitable for implementing the proposed method are described below. The particular frame format used in a given implementation may depend upon factors such as the way chipset vendors have implemented their network drivers. Such factors can influence which of the following frame formats is the most effective in delivering authentication information and the least disruptive to the computer's ordinary use of wireless networking.

Structured protocols like 802.11 organize data to be transmitted into protocol data units called frames. These are further divided into management frames and data frames.

By setting these fields appropriately, stations can communicate with one another. We will outline two different approaches: one based on an ordinary data frame, and two based on the beacon frame. Since some implementations may not accept data blindly sent to the broadcast address, we will demonstrate two methods to construct a valid beacon frame that will be ignored by a station's management entity as defined in 802.11, but still act as a vehicle for authentication information.

Broadcast Data Frame

A broadcast data frame follows the general frame format, given in TABLE 1.

TABLE 1

| | Frame Control | Duration/ID | Addr. 1 | Addr. 2 | Addr. 3 | Sequence Control | Addr. 4 | Frame Body | FCS |
|---|---|---|---|---|---|---|---|---|---|
| Bytes | 2 | 2 | 6 | 6 | 6 | 2 | 6 | <=2312 | 4 |

1. Frame Control—2 octets. In order to create a valid data frame that ordinary stations will accept, we set certain flags in this field as depicted in TABLE 2. Setting these flags indicates this is a data frame bound for its ultimate destination, not to be echoed by any nearby access points and indicates how the remainder of the frame is to be processed.

TABLE 2

| Bits | 0-1 | 2-3 | 4-7 | 8 | 9 | 10 | 11 | 12 | 13 | 14 | 15 |
|---|---|---|---|---|---|---|---|---|---|---|---|
| Name | Protocol Version | Type | Subtype | To DS | From DS | More Frag | Retry | Pwr Mgt | More Data | WEP | Order |
| Value | 00 | 10 | 0000 | 0 | 1 | 0 | 0 | 0 | 0 | 0 | 0 |

2. Duration/ID—2 octets. Since this frame is to be directed to the broadcast address, the duration value is set to zero.
3. Address 1—6 octets. This field holds the destination address. In the present embodiment this is the broadcast address denoted by setting each bit of this field equal to one.
4. Address 2—6 octets. This field holds the BSSID (Basic Service Set Identifier), which is ordinarily the address of the access point controlling the network. Since the wireless token in this illustrative embodiment does not participate in the association process, it will not know the proper BSSID to use, so we simply set it equal to the broadcast address. The BSSID mismatch introduces the strong possibility that the frame will be rejected by the network card or driver in the computer 104.

5. Address 3—6 octets. This field holds the source address. Since the wireless token in this illustrative embodiment accepts no replies, this field is a don't care, so we will set each bit equal to zero.
6. Sequence control—2 octets. Each frame sent by a station is assigned a sequence number, primarily to control retransmission. Since the wireless token in this illustrative embodiment will not support retransmission, we will simply set this field equal to zero.
7. Address 4—in frames of this type, this field is omitted.
8. Frame body—up to 2,312 octets. This field contains the authentication information for the present time interval.
9. FCS—4 octets. This field provides a CRC over the frame.

General Beacon Frame

As mentioned above, the fact that the wireless token in this illustrative embodiment may not know the correct BSSID may result in the frame being rejected by the network card or driver. Our research indicates that around 75% of the 802.11 chipsets in the field will behave this way. This problem is mitigated by using the frame sent by an access point to advertise its existence, namely, the beacon. The beacon is a management frame which follows the format shown in TABLE 3 and additionally specifies certain content to be carried in the frame body shown in TABLE 4.

TABLE 3

| | Frame Control | Duration | DA | SA | BSSID | Sequence Control | Frame Body | FCS |
|---|---|---|---|---|---|---|---|---|
| Bytes | 2 | 2 | 6 | 6 | 6 | 2 | <=2312 | 4 |

TABLE 4

| Order | Information |
|---|---|
| 1 | Timestamp |
| 2 | Beacon interval |
| 3 | Capability information |
| 4 | SSID |
| 5 | Supported rates |
| 6 | FH Parameter Set |
| 7 | DS Parameter Set |
| 8 | CF Parameter Set |
| 9 | IBSS Parameter Set |
| 10 | Traffic Indication Map |

Since we want this frame to be received by every nearby station, we set the DA (Destination Address) field and the BSSID to be the broadcast address. The value of SA is unimportant, or called a "don't care," as the wireless token in this illustrative embodiment does not accept frames.

Now we set the fields in the frame body in such a way that we construct a valid beacon frame that allows us to communicate authentication information, but appear to be such an unattractive access point that no ordinary stations would try to associate.

We further define two different beacon frames: one designed for maximum compatibility and one designed for maximum throughput.

Beacon for Maximum Compatibility

This beacon frame uses no special fields. Instead, it uses the SSID field, typically used to carry the advertised name of the access point, to carry authentication information. The standard allows for an SSID of up to 32 bytes. Microsoft Windows XP drivers report a list of the SSIDs of the access points detected. See Microsoft Corp. "Scanning 802.11 Networks," in Microsoft Developer Network Library. This fact means that driver support for promiscuous mode is not required, allowing for compatibility with any 802.11 chipset under Windows. As a matter of course, the Windows operating system causes this list of SSIDs to be periodically refreshed. But additionally, the list can be explicitly refreshed by a calling application. Windows requires the driver to respond with a new list within six seconds. This fact means that with an eye toward maximum compatibility, we have in this illustrative embodiment a communication channel capable of delivering 256 bits every six seconds.

1. Timestamp—8 octets. These fields are a don't care, so we set them to zero.
2. Beacon interval—2 octets. Another don't care, so we set them to zero.
3. Capability information—2 octets. In order to create a valid beacon frame that contains the fields that we need, we set certain flags in this field as shown in TABLE 5A to indicate this beacon comes from an access point.

TABLE 5A

| Bit | 0 | 1 | 2 | 3 | 4 | 5-15 |
|---|---|---|---|---|---|---|
| Name | ESS | IBSS | CF Pollable | CF Poll Request | Privacy | Reserved |
| Value | 1 | 0 | 0 | 0 | 0 | 0 |

4. SSID—up to 32 octets. This field will carry the authentication information, as described below. The authentication information value may simply be a SecurID® tokencode, or perhaps a one-time password or other value from another protocol.
5. Supported Rates—up to 8 octets. To discourage stations from trying to associate with the token, we set the length field to zero, implying that the wireless token in this illustrative embodiment supports no data rates at all.
6. FH Parameter Set—5 octets set to zero.
7. DS Parameter Set—1 octet set to zero.
8. CF Parameter Set—6 octets set to zero.
9. IBSS Parameter Set—not present in a beacon frame of this type
10. Traffic Indication Map—up to 254 octets. In this beacon frame format, we will leave this field empty.

Beacon for Maximum Throughput

The data field with the largest capacity listed above is the Traffic Indication Map. Since it is much larger than the SSID field, it may be desirable to use it in a given embodiment. Unfortunately, the standard allows certain implementations to ignore this field, since it comes after the SSID field during a transmission.

In particular, the standard states as follows: "STAs in an infrastructure network shall only use other information in received Beacon frames, if the BSSID field is equal to the MAC address currently in use by the STA contained in the AP of the BSS." The statement appears to have two possible effects. On one hand, we do want the management entity to ignore the rest of this beacon and not try and associate with the token. On the other, an implementer could interpret the statement to mean that the rest of the beacon could be ignored and not reported to higher layer software.

Even though the Microsoft Windows driver interface provides a mechanism for a calling application to obtain the data contained in this field, the apparent ambiguity means that some chipsets may not report the contents of this field. Chips that support promiscuous mode, for instance, will most likely report the contents of this field, while the behavior of other chipsets is unknown.

1. Timestamp—8 octets. These fields are a don't care, so we set them to zero.
2. Beacon interval—2 octets. Another don't care, so we set them to zero.
3. Capability information—2 octets. In order to create a valid beacon frame that contains the fields that we need, we set certain flags in this field as shown in TABLE 5B to indicate this beacon comes from an access point.

TABLE 5B

| Bit | 0 | 1 | 2 | 3 | 4 | 5-15 |
|---|---|---|---|---|---|---|
| Name | ESS | IBSS | CF Pollable | CF Poll Request | Privacy | Reserved |
| Value | 1 | 0 | 0 | 0 | 0 | 0 |

4. SSID—up to 32 octets. Once again, we can use this field for data payload. In this instance, its use may be restricted to only those cases when a token has more than 254 bytes to report at a time.
5. Supported Rates—up to 8 octets. To discourage stations from trying to associate with the token, we set the length field to zero, implying that the token in this illustrative embodiment supports no data rates at all.
6. FH Parameter Set—5 octets set to zero.
7. DS Parameter Set—1 octet set to zero.
8. CF Parameter Set—6 octets set to zero.
9. IBSS Parameter Set—not present in a beacon frame of this type
10. Traffic Indication Map—up to 254 octets. This is the information element we will use to carry the authentication information. It is described in TABLE 6.

TABLE 6

| Name | Element ID | Length | DTIM Count | DTIM Period | Bitmap control | Partial Virtual Bitmap |
|---|---|---|---|---|---|---|
| Octets | 1 | 1 | 1 | 1 | 1 | 1-251 |
| Value | 5 | Varies | 0 | 1 | 255 | Authentication information |

Format for Authentication Information

Regardless of which of the above-described methods is used to transport the authentication information, a format is needed by which the authentication information consumer, such as a computer, may recognize and interpret the information properly. The user may be situated in an environment with any number of other access points. In fact, network security tools exist which cause a computer to emit a large number of bogus beacon frames in an attempt to confuse a would-be attacker. The wireless token should remain functional in this challenging environment.

At the same time, we need to remain mindful of privacy concerns. For example, a wireless token generally should not enable surreptitious tracking of users. The potential for this abuse of RFID technology has resulted in considerable strife and the beginnings of legislation concerning retail supply chain applications. For these reasons, the wireless token in this illustrative embodiment may be implemented so as to not broadcast a fixed identifier that corresponds with a token holder's claimed identity. In particular, the wireless token could emit only a non-predictable time-varying value. It is then up to the verifier or the computer in this case to determine which identity the token holder is claiming.

Recall that the authentication information in this embodiment comprises what are essentially random-looking bits. For a computer to support multiple users, it must be able to determine from which token it received authentication information. But taking the approach of sending a fixed identifier would compromise privacy.

For this reason, we encrypt the authentication information under a symmetric key of the type described previously herein. The computer may maintain a table of symmetric keys corresponding with those tokens it can authenticate. In order to determine from which token authentication information originated, the computer may simply perform trial decryption using each key in the table until a successful decryption occurs. Modern symmetric ciphers like AES are extremely efficient on today's processors. Especially given the trend toward multicore processors, many thousands or millions of trial AES decryptions can be performed every second.

So that the computer can detect a successful trial decryption, a fixed identifier is prepended to the authentication information before it is encrypted. This fixed identifier could also include a version number to allow for future extensibility. For example, the phrase "RSABBR1.0" or simply "RSA10" would ensure that with very high probability a successful trial decryption indicates authentication information meant for the consumer. Of course, a phrase like this serves only to provide redundancy, and an error detecting or correcting code could be used instead.

This approach introduces the possibility of a timing attack on the computer. For this reason, an implementation of the computer should either reorder the table of possible tokens after every successful initial identification or simply perform the remaining trial decryptions even after a token has been identified. After initial identification, a token's decryption key may be kept in a cache to improve performance. As with the full table, care should be taken to avoid timing attacks once again by either reordering the cache or simply performing the remaining trial decryptions.

In addition, a token that sends its beacon frames at a precisely predetermined interval may lend itself to surreptitious identification based on this property alone. To avoid this sort of timing attack, the wireless token in this illustrative embodiment can produce its output not at a strictly predetermined interval, but rather at a randomly determined moment within a predetermined interval. In practice, this approach could be implemented by including a random or pseudorandom factor in the determination of output time. Given the relatively coarse granularity of today's Windows XP access point detection time, this requirement should not degrade performance.

Regardless of whether the verifier that protects access to a particular resource is local or remote, some local device must be consuming the authentication information. Often, the verifier will allow a user to continue accessing a particular resource while authentication information has been recently received, revoking this access if the authentication information has not been recently received or if it was received at particularly low signal strength. Although this device might be a mobile telephone, PDA, or other processing device, many applications today will likely use a computer running Windows. For this reason, we focus on the design issues relevant to this platform, although other platforms such as Linux can of course be used. As is well known, Windows has evolved a layered approach to support network protocols and peripherals such as network interface cards.

In the present illustrative embodiment, authentication software running on the computer gains access to the authentication information sent by the token by opening a socket to a Network Driver Interface Specification (NDIS) protocol driver. See "Introduction to the Win32 NDIS API," Rawether.net, Printing Communications Associates, Inc. In contrast to a complex protocol driver like that implementing the TCP/IP protocol, a protocol driver suitable for use in this embodiment simply reports beacon frames to the authentication software. To do this, it requests that the NDIS Miniport Driver provide notification of only beacon frames received over the 802.11 interface. It further asks the driver to scan for access points by setting the OID_802_11_BSSID_LIST_SCAN. Once this is done, six seconds later, it can ask for the updated list by setting the OID_802_11_BSSID_LIST.

Again, the particular details of the illustrative embodiments described in this Appendix should not be construed as limitations of the present invention.

What is claimed is:

1. A method comprising the steps of: deriving a base point on an elliptic curve in a first processing device;
generating authentication information in the first processing device utilizing the base point and a private key of the first processing device; and
transmitting the authentication information from the first processing device to a second processing device via a communications network;
wherein the authentication information is utilized by the second processing device to generate modified authentication information suitable for providing joint authentication of the
first and second processing devices to a verifying device; and
wherein the verifying device jointly authenticates the first and second processing devices utilizing the modified authentication information.

2. The method of claim 1 wherein the base point on the elliptic curve is derived by applying a one-way function to a current time value.

3. The method of claim 1 wherein the base point on the elliptic curve is derived by computation based on a message to be signed.

4. The method of claim 1 wherein the authentication information transmitted from the first processing device to the second processing device comprises a value $K_1^{(T)} = SK_1 G^{(T)}$, where $SK_1$ denotes the private key and $G^{(T)}$ denotes the base point on an elliptic curve E for a current time value T, and the first processing device is authenticated by the second processing device based on verification that $ê(K_1^{(T)}, H) = ê(G^{(T)}, PK_1)$, where $ê$ is a pairing operator defined over E×E, H is a public randomly-selected point on the elliptic curve E, and $PK_1 = SK_1 H$ is a public key corresponding to the secret key $SK_1$.

5. The method of claim 1 wherein the authentication information transmitted from the first processing device to the second processing device is also transmitted to an authentication server.

6. The method of claim 1 wherein the first processing device comprises an authentication token.

7. The method of claim 6 wherein the authentication token comprises a wireless authentication token.

8. The method of claim 1 wherein:
the authentication information transmitted from the first processing device to the second processing device comprises a value $K_t^{(T)} = SK_t G^{(T)}$, where $SK_t$ denotes the private key of the first processing device and $G^{(T)}$ denotes the base point on an elliptic curve E for a current time value T;
the modified authentication information comprises a value $K_{t,m}^{(T)} = SK_m SK_t G^{(T)}$ computed by the second processing device on receiving the value $K_t^{(T)}$, where $SK_m$ denotes a private key of the second processing device.

9. The method of claim 8 wherein joint authentication of the first processing device and the second processing device is based on verification that $ê(K_{t,m}^{(T)}, H) = ê(G^{(T)}, PK_{t,m}) (= ê(G^{(T)}, H)^{SK_m SK_t})$, where $ê$ is a pairing operator defined over E×E, H is a public randomly-selected point on the elliptic curve E, and $PK_{t,m} = SK_t SK_m H$ is a joint public key shared by the first processing device and the second processing device.

10. The method of claim 1 wherein the authentication information transmitted from the first processing device to the second processing device masks an identity of first processing device such that joint authentication of the first processing device and the second processing device does not require the second processing device to reveal the identity of the first processing device.

11. A first processing device comprising: a memory;
a processor coupled to the memory; and interface circuitry coupled to the processor; the processor being configured:
to derive a base point on an elliptic curve;
to generate authentication information utilizing the base point and a private key of the first processing device; and
to transmit the authentication information to a second processing device via a communications network;
wherein the authentication information is utilized by the second
processing device to generate modified authentication information suitable for providing joint authentication of the first and second processing devices to a verifying device; and
wherein the verifying device jointly authenticates the first and second processing devices utilizing the modified authentication information.

12. The first processing device of claim 11 wherein:
the authentication information transmitted from the first processing device to the second processing device comprises a value $K_t^{(T)} = SK_t G^{(T)}$, where $SK_t$ denotes the private key of the first processing device and $G^{(T)}$ denotes the base point on an elliptic curve E for a current time value T;
the modified authentication information comprises a value $K_{t,m}^{(T)} = SK_m SK_t G^{(T)}$ computed by the second processing device on receiving the value $K_t^{(T)}$, where $SK_m$ denotes a private key of the second processing device.

13. The first processing device of claim 12 wherein joint authentication of the first processing device and the second processing device is based on verification that $ê(K_{t,m}^{(T)}, H) = ê(G^{(T)}, PK_{t,m}) (= ê(G^{(T)}, H)^{SK_m SK_t})$ where $ê$ is a pairing operator defined over E×E, H is a public randomly-selected point on the elliptic curve E, and $PK_{t,m} = SK_t SK_m H$ is a joint public key shared by the first processing device and the second processing device.

14. A system comprising the first processing device of claim 11 and the second processing device of claim 11.

15. An article of manufacture comprising a non-transitory computer-readable storage medium storing one or more software programs which when executed by a processor of a first processing device implements the steps of:
deriving a base point on an elliptic curve in a first processing device; generating authentication information in the first processing device utilizing the base point and a private key of the first processing device; and
transmitting the authentication information from the first processing device to a second processing device via a communications network;
wherein the authentication information is utilized by the second processing device to generate modified authentication information suitable for providing joint authentication of the first and second processing devices to a verifying device; and
wherein the verifying device jointly authenticates the first and second processing devices utilizing the modified authentication information.

16. The article of manufacture of claim 15 wherein:
the authentication information transmitted from the first processing device to the second processing device comprises a value $K_t^{(T)} = SK_t G^{(T)}$, where $SK_t$ denotes the private key of the first processing device and $G^{(T)}$ denotes the base point on an elliptic curve E for a current time value T;
the modified authentication information comprises a value $K_{t,m}^{(T)} = SK_m SK_t G^{(T)}$ computed by the second processing device on receiving the value $K_t^{(T)}$, where $SK_m$ denotes a private key of the second processing device.

17. The article of manufacture of claim 16 wherein joint authentication of the first processing device and the second processing device is based on verification that $\hat{e}(K_{t,m}^{(T)}, H) = \hat{e}(G^{(T)}, PK_{t,m})(=\hat{e}(G^{(T)}, H)^{SK_m SK_t})$, where $\hat{e}$ is a pairing operator defined over E×E, H is a public randomly-selected point on the elliptic curve E, and $PK_{t,m} = SK_t SK_m H$ is a joint public key shared by the first processing device and the second processing device.

18. A method comprising:

receiving authentication information at a second processing device from a first processing device via a communications network, the authentication information being generated in the first processing device utilizing a private key of the first processing device and a base point on an elliptic curve derived in the first processing device;

computing modified authentication information in the second processing device; and providing the modified authentication information to a verifying device to jointly authenticate the first processing device and the second processing device;

wherein the verifying device jointly authenticates the first and second processing devices utilizing the modified authentication information.

19. The method of claim 18 wherein:

the authentication information received at the second processing device from the first processing device comprises a value $K_t^{(T)} = SK_t G^{(T)}$, where $SK_t$ denotes the private key of the first processing device and $G^{(T)}$ denotes the base point on an elliptic curve E for a current time value T;

the modified authentication information comprises a value $K_{t,m}^{(T)} = SK_m SK_t G^{(T)}$ computed in the second processing device on receiving the value $K_t^{(T)}$, where $SK_m$ denotes a private key of the second processing device.

20. The method of claim 19 wherein joint authentication of the first processing device and the second processing device is based on verification that $\hat{e}(K_{t,m}^{(T)}, H) = \hat{e}(G^{(T)}, PK_{t,m})(=\hat{e}(G^{(T)}, H)^{SK_m\ SK_t})$, where $\hat{e}$ is a pairing operator defined over E×E, H is a public randomly-selected point on the elliptic curve E, and $PK_{t,m} = SK_t SK_m H$ is a joint public key shared by the first processing device and the second processing device.

* * * * *

UNITED STATES PATENT AND TRADEMARK OFFICE
CERTIFICATE OF CORRECTION

PATENT NO. : 9,923,718 B2  
APPLICATION NO. : 13/961319  
DATED : March 20, 2018  
INVENTOR(S) : Daniel Vernon Bailey et al.

Page 1 of 1

It is certified that error appears in the above-identified patent and that said Letters Patent is hereby corrected as shown below:

In the Specification

Column 15, Line 28, please delete "(v={0, 1}, $K_s^{(r+1)}$:" and replace it with --(v={0, 1}, $K_s^{(r+1)}$):--

Column 17, Line 53, please delete "$(=\hat{e}(G^{(T)},H)^{SK_t})$." and replace it with --$(=\hat{e}(G^{(T)},H)^{SK_t})$.--

Column 17, Line 58, please delete "$\hat{e}(K)_{t,m}^{(T)},H)=\hat{e}(G^{(T)}),PK_{t,m})$" and replace it with --$\hat{e}(K_{t,m}^{(T)},H) =\hat{e}(G^{(T)}),PK_{t,m})$--

Column 20, Line 33, please delete "$\{k^{(j)}=h^{(z+2)d\cdot j-1}(k)\}$" and replace it with --$\{k^{(j)}=h^{((z+2)d\cdot j-1)}(k)\}$--

Column 20, Line 35, please delete "$\{k^{(j)}=h^{(z+2)d\cdot j-1}(k)\}_{j=zd}^{(z+2)d-1}$." and replace it with --$\{\hat{k}^{(j)}=h^{((z+2)d\cdot j-1)}(\hat{k})\}_{j=zd}^{(z+2)d-1}$.--

In the Claims

Column 29, Line 13, Claim 1 please delete the return after "the"

Column 29, Line 34, Claim 4 please delete "secret" and replace it with --private--

Column 29, Line 56, Claim 9 please delete "$\hat{e}(K_{t,m}^{(T)}$'H)" and replace it with --$\hat{e}(K_{t,m}^{(T)},H)$--

Column 30, Line 11, Claim 11 please delete the return after "second"

Signed and Sealed this  
Third Day of July, 2018

Andrei Iancu  
*Director of the United States Patent and Trademark Office*